United States Patent

Asano et al.

[11] Patent Number: 5,984,770
[45] Date of Patent: Nov. 16, 1999

[54] METHOD AND APPARATUS FOR SEPARATING BONE AND MEAT OF UPPER HALF OF POULTRY CARCASS AND AUTO-LOADING SYSTEM USED THEREWITH

[75] Inventors: Takeo Asano; Hiroyuki Hayakawa; Ryuji Kodama; Shouzou Kouzu; Yasuaki Nomura; Yoshimitsu Fujiwara, all of Tokyo, Japan

[73] Assignee: Mayekawa Mfg. Co., Ltd., Tokyo, Japan

[21] Appl. No.: 08/880,513

[22] Filed: Jun. 23, 1997

[30] Foreign Application Priority Data

Jun. 21, 1996 [JP] Japan ................................. 8-181302
Jul. 24, 1996 [JP] Japan ................................. 8-213146
Aug. 26, 1996 [JP] Japan ................................. 8-242579

[51] Int. Cl.⁶ ...................................................... A22C 21/00
[52] U.S. Cl. ............................................. 452/165; 452/169
[58] Field of Search ................................... 452/169, 165, 452/166, 167

[56] References Cited

U.S. PATENT DOCUMENTS

| | | |
|---|---|---|
| 4,856,144 | 8/1989 | DeGreef . |
| 4,935,990 | 6/1990 | Linnenbank .......................... 452/169 |
| 5,312,291 | 5/1994 | van den Nieuwelaar et al. ..... 452/169 |
| 5,368,520 | 11/1994 | Kock et al. . |
| 5,407,383 | 4/1995 | Diesing et al. . |
| 5,411,434 | 5/1995 | McGoon et al. . |
| 5,429,549 | 7/1995 | Verrijp et al. . |
| 5,453,045 | 9/1995 | Hobbel et al. . |

FOREIGN PATENT DOCUMENTS

| | | |
|---|---|---|
| 259920 A1 | 3/1988 | European Pat. Off. . |
| 695506 | 2/1996 | European Pat. Off. . |
| 695506 A2 | 2/1996 | European Pat. Off. . |
| 2606596 | 5/1988 | France . |
| 2701632 | 8/1994 | France . |
| 8900871 | 11/1990 | Netherlands . |

*Primary Examiner*—Willis Little
*Attorney, Agent, or Firm*—Evenson, McKeown, Edwards & Lenahan, P.L.L.C.

[57] ABSTRACT

A method and apparatus for separating bone and meat of the upper half of a poultry carcass with a variety of the sizes are provided, wherein first cutting is effected in the neighborhood of a shoulder joint to disconnect tissues under influence of a separation force applied between the upper half of a poultry carcass and the head of a humerus, second cutting is effected along the surface of the front side of a furcula, and then breast meat is efficiently separated by a conventional device with a higher recovery rate and an auto-loading system comprising a plurality of buffer conveyors is provided, wherein the upper halves of poultry carcasses are continuously loaded to as many apparatuses for the separating without downtime. In the first cutting of the method and an apparatus for the separating, an inserting position and depth of an obliquely moving cutter blade (116) is properly determined with accuracy by the help of a guide bar with reference pieces, which is selected according to the size of the upper half of a poultry carcass and put inside the shoulder joints for setting reference planes, vertical and horizontal.

18 Claims, 16 Drawing Sheets

Fig. 3
(A)
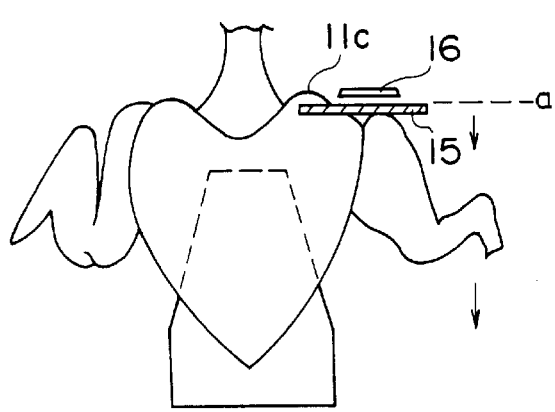
(B)
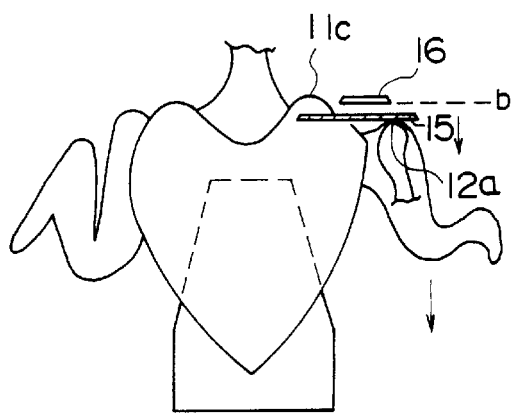
(C)
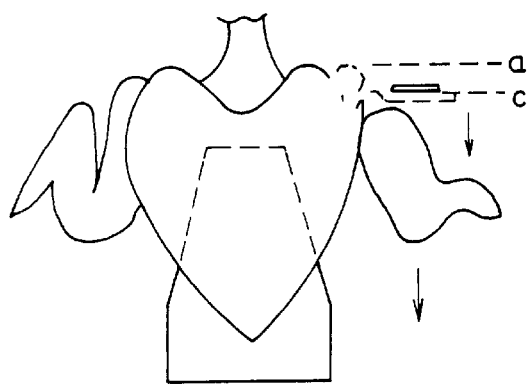
(D)
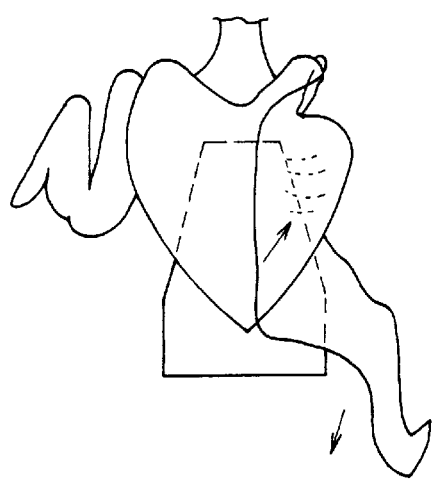

Fig. 4
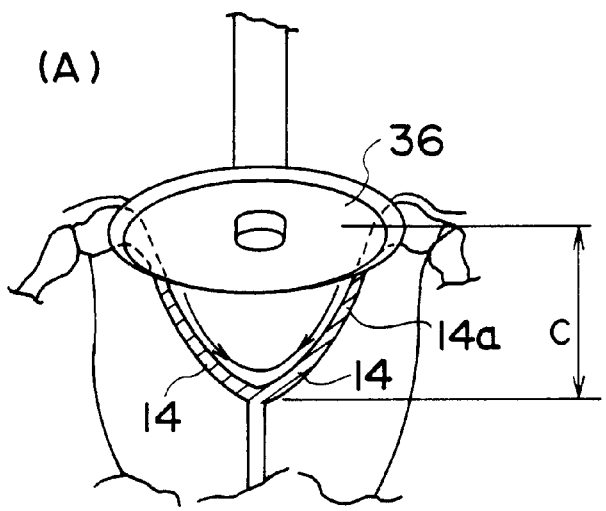
(A)
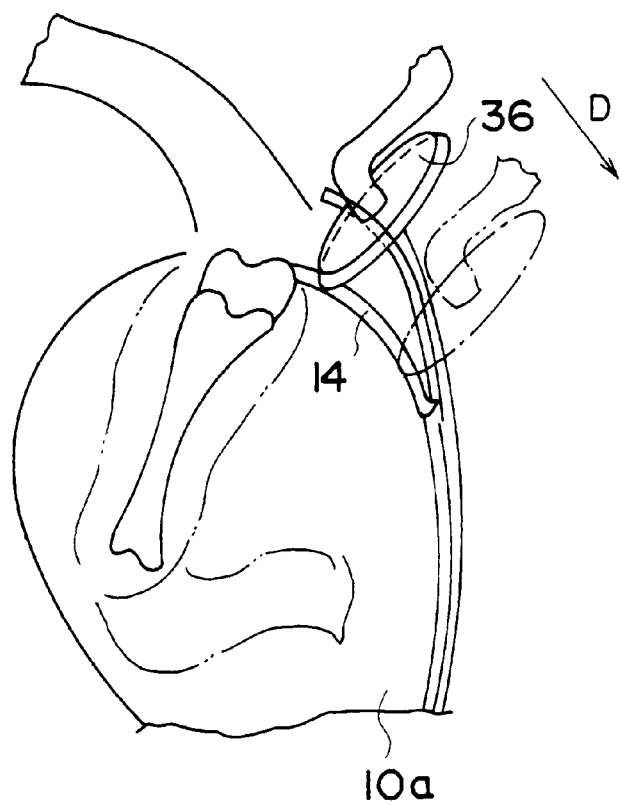
(B)

(A)          (B)

METHOD AND APPARATUS FOR SEPARATING BONE AND MEAT OF UPPER HALF OF POULTRY CARCASS AND AUTO-LOADING SYSTEM USED THEREWITH

BACKGROUND OF THE INVENTION

1. Field of the Invention

This invention relates to a method and apparatus for separating bone and meat of an upper half of a poultry carcass, from which legs have been cut off (hereinafter simply referred to as upper half), and an auto-loading system used with the apparatus, wherein tissues such as a tendon, ligament, muscle, envelope and the like around a shoulder joint are cut and breast meat is separated from a bone together with wings in a stable manner and, more particularly, to the method and apparatus, in which the separation can automatically be effected with high flexibility to difference in size of upper halves and with a high recovery rate, and the auto-loading system for upper halves, in which the upper halves are continuously transported to feed a plurality of apparatuses for the separating by the help of as many buffer conveyors each for a temporary stay of an upper half awaiting its turn of loading.

2. Description of the Related Art

Recently, breeding, slaughtering, and processing of carcasses of poultry have been grown up to a large scale in a related industry and a variety of automation has largely been carried out in the growth. In the mean time, cutting-off of legs from a carcass of poultry has still been conducted manually. Methods and apparatuses suitable for the use of deboning of the legs have already been proposed by the same inventors.

Separation of breast meat in an upper half, whose leg portions are removed in a previous process, has also been carried out by manual operation. In such manual operation, there has been arisen problems that separated breast meat and supreme (white meat), which remains between furcula, are subject to damages and thereby to their devaluation as article of commerce. Moreover, an operator necessarily conducts manual operation while palms and fingers contact with meat directly, which makes a managing cost in an hygienic aspect higher and, besides, a direct production cost higher due to a lower recovery rate.

Now, description will given about breast meat 10a. An ideal cut plane 35 exists around shoulder joint 11, as seen from a perspective view in FIGS. 8 and 9. Muscle of the supreme 10b is connected with a humerus, which combines with the glenoid 11b of a shoulder joint 11 combines and on the other hand the breast meat 10a and a wing 12 are connected with the shoulder joint 11 by way of a breast muscle and a brachial muscle respectively. The breast meat 10a is present in an area formed by being surrounded by a scapula 11a, the upper portion of an os coracoideum 13 and a furcula 14.

The shoulder joint 11 is integrated with the head (not shown) 12a of a humerus 12b which fits in the glenoid 11b of the scapula 11a by the help of tissues such as a ligament, tendon, muscle, envelope and the like, said scapula 11a joining with a furcula 14 and os coracoideum 13, as seen from FIG. 9.

As can be seen from the above description, separation of breast meat is conducted after cutting the tissues such as a tendon, ligament, muscle, envelope and the like combined with the scapula 11a and the head 12a of a humerus 12b (hereinafter referred to as shoulder joint cutting). A recovery is affected at a great extent by performance in the shoulder joint cutting, that is, if the position and depth of the shoulder cutting is proper for the size of an upper half, a better recovery is secured.

In order to achieve the purpose, it is necessary to properly set the inserting position and cutting depth of a cutter blade in an area for shoulder joint cutting in response to different sizes of the upper half with flexibility of operation.

Configuration of tendons in tissues which are an object of the shoulder joint cutting has been investigated in regards to their positional relations with sizes of upper halves. The following conclusion has been obtained, as a result of detailed studies on the basis of figures of a skeletal system.

1. In FIGS. 14(A), 14(B) and 14(C), the skeleton of an upper half is shown in a front elevational view as seen from the breast side, side elevational view and rear elevational view and FIGS. 15(A) and, 15(B) are enlarged views of encircled portions designated at D and E, each of which include a shoulder joint, in the FIGS. 14(B) and 14(C).

It can be seen from FIGS. 15(A) and 15(B) that:

a) the heads 11c, 12a of a scapula and humerus are combined with each other by two pairs of tendons (i) and (ii); and b) a tendon (i) is located outwardly of a tendon (ii), as seen from a rear elevational view of FIG. 15(B), a tendon (ii) is originated at the head 11c of a scapula 11b and extends to the head 12a of a humerus 12b outwardly and obliquely relative thereto, and the tendon (ii) is also originated at the head 11c of a scapula 11b and extends to the head 12a of a humerus downwardly and almost vertically.

2. Next, an inserting position of a cutter blade in a shoulder joint cutting is discussed. As can be seen from FIG. 12, a vertical reference plane Ya is set on the inside of the head 11c of a scapula 11b and a horizontal reference plane Xa is set on the head 12a of a humerus 12b. An inserting position of an obliquely moving cutter blade 116 is at distances of Sa from the vertical reference plane Ya and of Ha from the horizontal plane Xa, wherein these values of Sa and Ha fluctuate only in a span of 2 to 3 mm for all the variations in size of upper halves, which is small enough to be neglected.

In consideration of the above situation, it has been found that the position of the obliquely moving cutter blade 116 can be set at an almost proper position, if location of the vertical reference plane is adjusted according to the size of an upper half as work, while a inserting position of the obliquely moving cutter blade 116 is selected at a constant distance from the vertical reference plane Ya, but a problem is how to adjustably determine a location of the vertical reference plane according to a size of the upper half.

As a further finding, it is required in cutting of tissues around a shoulder joint that the two pairs of tendons (i) and (ii) are cut, as described in 1 a), that cutting of tendons (i) is conducted obliquely from an external position in the air, as described in 2 b), and on the other hand, that cutting of tendons (ii) is conducted horizontally.

3. As to a depth of inserting of a cutter blade in cutting the tendons (ii), as can be seen in FIG. 15(B), it has been found that meat is not damaged, even if the edge of the cutting blade is sent till it contacts with the lower portion of the head 11c of a scapula on condition that a direction of the cutter blade is adjusted to be horizontal especially in the last instant of the cutting operation. That is, it has been understood together with the other descriptions of 1 a) and 1 b) that it is only required that two directions of insertion are adopted for a cutting blade and a direction of the cutting blade is required to be horizontal only in the last instant of operation.

Leg portions of a poultry carcass are separated by dividing the carcass at a hip joint and removing spurs and toes and even a skilled worker have been able to debone the legs portions to recover thigh meat at an average rate of 720 leg portions or 360 poultry carcasses per day.

A solution for the above problems has been proposed and tried to automate and rationalize a deboning operation, which is disclosed, for example, in the specification of Japanese Patent Application No. H 4-203528 already filed. According to the specification, a deboning method of poultry suitable for automation and an automated deboning apparatus are disclosed.

The deboning apparatus has, as shown in FIG. 24, a construction that a rotary octagonal table 300 is equipped, processing stations S1 to S8 are located in respective positions of the sides. At the station S1, the tibia 306 of a leg as a work that is shown in FIG. 23, and which has been transported by a conveyor 301, is manually inserted in a chuck (not shown) to fix for deboning. After the chucking, the leg is subjected to various processing, such as extraction by a tool and separating meat by scraping, in given sections F, F, G in the order, from bones, while effecting a first and second cuttings by rotary cutter blades, as shown in FIG. 23, in each of the processing stations S1 to S8 in an automatic fashion with an intermittent feed.

The above mentioned deboning apparatus is also applicable to any form of a cut-up part of poultry, that is to an upper half, which is a processing object of this invention. An auto-loader suitable for such a deboning apparatus has not been proposed in the sense of practical use.

SUMMARY OF THE INVENTION

This invention has, accordingly, an object to provide a method and apparatus, in which breast meat and supreme of poultry can be separated without any damage thereon by only giving a cut plane in portions other than the neighborhood of a shoulder join and adopting proper separating means to an area in the neighborhood of the shoulder joint complicated with a plurality of a tendon, ligament, muscle, envelope and the like.

This invention has another object to provide a method and apparatus, in which variations in size of the upper halves of poultry carcasses are automatically absorbed in a manner such that inserting position and depth of a cutter blade in cutting is properly controlled by adjusting them according to a magnitude of a variation in size of the upper half of a poultry carcass and thereby cutting is effected with a better recovery of meat.

This invention has still another object to provide an auto-loading system for perfect automation in a method and apparatus of this invention, in which a feed conveyor is included for transportation of a cut-up part of a poultry carcass, such as an upper half, a plurality of buffer conveyors each for a temporary stay of each work awaiting its loading are installed at as many points along the moving direction of the conveyors to form another stream of works in parallel to that in the feed conveyor and one apparatus for separation of a cut-up part is installed at a downstream position of each buffer conveyor in order to efficiently feed a cut-up part to the apparatus without any delay and at the same time without the least stoppage of the apparatus, wherein a chuck for the use in the apparatus is of an auto-chucking structure.

A first aspect of this invention is directed to a method for separating breast meat together with wings from the upper half of a poultry carcass, characterized in that the breast meat is separated together with the wings by cutting tissues such as a tendon, ligament, muscle, envelope and the like, which are present between or in the vicinity of the head of a humerus and a glenoid of a scapula, which construct a shoulder joint, while a separating force is applied between the body of the upper half and a wing.

The first aspect is to be conducted in a condition that cutting of the tissues such as a tendon, ligament, muscle, envelope and the like concentrated around the shoulder joint and separation between the head of humerus and the glenoid of a scapula is made in a first stage of operation.

It is preferable in the first aspect that the separating force directly acts on the humerus as a pulling force so as to pull the humerus away from the body of the upper half, wherein the acting point of the separation force is specially designated to be between the body of the upper half and the humerus.

It is preferable in the first aspect that the separation force acts on the head of the humerus.

It is preferable in the first aspect that the separating force causes dislocation between the glenoid and the head of the humerus. In order to effectively perform the dislocation, a magnitude of the separating force is specially designated, a portion to which cutting is applied is exposed and meat portion under the wings is protected.

It is preferable in the first aspect that a combination of application of the separation force and cutting of the tissues is repeated in several times.

A second aspect of this invention is directed to a method for separating breast meat together with wings from the upper half of a poultry carcass, characterized in that cutting around a shoulder joint for cutting tissues such as a tendon, ligament, muscle, envelope and the like between the head of a humerus and glenoid is effected under influence of a separating force acted between the body of the upper half and the humerus and that cutting along a surface of the front side of a furcula is effected.

A third aspect of this invention is directed to an apparatus for effecting the method of the first aspect of this invention for separating breast meat together with wings from the upper half of a poultry carcass, characterized in that the apparatus comprises a fit-insert cone which is inserted into the upper half of a poultry carcass, which is used for determining a location of a shoulder joint comprising the head of a humerus and a glenoid, a separator which makes it possible to press down the head of a humerus, while being engaged with the joint of scapula, a cutter blade for cutting tissues and a separating mechanism.

A fourth aspect of this invention is directed to an apparatus for effecting the method of the second aspect of this invention for separating breast meat together with wings from the upper half of a poultry carcass, characterized in that the apparatus comprises a fit-insert cone for inserting into the upper half which is used for determining a location of a shoulder joint comprising the head of a humerus and a glenoid, a separator which makes it possible to press down the head of a humerus, while being engaged with the joint of scapula, a cutter blade for cutting tissues, a separating mechanism, and means for cutting the breast and/or back except for a neighboring portion of the shoulder joint.

It is preferable in the third and fourth aspects that the fit-insert cone is formed in the shape of a truncated cone.

It is preferable in the third and fourth aspects that the separator is a profiled plate with a concave opening increasing in width toward the fore end for engaging with the joint portion of a scapula and moreover, has downwardly pointing edges, for biting-in when a pressing force is applied, integrally formed at the fore end of the lower side.

It is preferable in the third and fourth aspects that the separator has a plurality of protrusions like a spike planted on the lower side.

It is preferable in the third and fourth aspects that the separator has an oscillating mechanism to make it possible to apply a pressing force in any desired direction.

It is preferable in the third and fourth aspects that the separator is equipped with a vibrator mechanism.

It is preferable in the third and fourth aspects that the separator is equipped with an auto-adjustment aligning mechanism which is capable of detecting the joint of a scapula to engage with.

It is preferable in the third and fourth aspects that the cutter blade can be applied in a horizontal direction.

It is preferable in the third and fourth aspects that the cutter blade can be applied in any desirable direction.

It is preferable in the third and fourth aspects that the cutter blade employs the separator as a guide to expose a portion, to which the cutting is to be applied, and the meat portions under the wings are protected to improve a recovery rate.

It is preferable in the third and fourth aspects that the apparatus further comprises a mechanism for selecting a desired number of times in repeating a combination of a pressing force of the separator and the cutting action, which interlocks with the pressing force, and effecting the repetition.

It is preferable in the fourth aspects that the cutting means is further capable of cutting across the surface of the front side of the furcula.

It is preferable in the third aspect that a plurality of cutter blades for exclusively cutting the tissues around the shoulder joint are employed.

A fifth aspect of this invention is directed to a method according to the first aspect of this invention for separating breast meat together with wings from the upper half of a poultry carcass, wherein the tissues in the neighborhood of the shoulder joint which comprise two pairs of tendons as main parts connecting a scapula and the head of a humerus are cut and the cutting is carried out in the steps of: inserting a guide bar with a proper size corresponding to a size of the upper half of a poultry carcass while pressing into a space between the shoulder joints; setting a vertical reference plane on the inside of the shoulder joint, which reference plane is for determination of an inserting position of the horizontally moving cutter blade by a distance in a lateral direction from the vertical reference plane; setting a horizontal plane, which is used for determination of an inserting position of the horizontally moving cutter blade by a distance in a vertical direction from the horizontal reference plane; inserting an obliquely moving cutter blade from an inserting position obliquely in respect to the vertical reference plane; cutting all the outside tendons and part of the inside tendons with the obliquely moving cutter blade to reduce a bonding force; and then inserting the horizontally moving cutter blade into a gap between the joint and the head of a humerus, which has already been widened by the pressing force applied to the head of a humerus, in order to completely cut the rest of the inside tendons remaining uncut.

The fifth aspect of this invention is a method to automatically adjust the operating conditions according to a size of the upper half of a poultry carcass by regulating an inserting position of the horizontally moving cutter blade for cutting the tissues both in the vertical and lateral directions with the help of the guide bar of a proper size corresponding to a span between the shoulder joints, which guide bar is inserted by the pressing force and then by effecting inserting of the horizontally moving cutter blade at a right position to completely cut the tissues around the shoulder joint.

A sixth aspect of this invention is directed to an apparatus according to the third aspect of this invention for separating breast meat together with wings from the upper half of a poultry carcass, wherein the apparatus further comprises: a plurality of guide bars for determining locations of the vertical and horizontal reference planes, each of which has a proper size corresponding to a size of the upper half of a poultry carcass, and one of which is inserted while a pressing force is applied; an obliquely moving cutter blade, which is mounted on a guide bar, is inserted at a right position to cut all the outside tendons and part of the inside tendons; and the horizontally moving cutter blade completely cuts the rest of the inside tendons remaining uncut.

The sixth aspect is to automatically adapt operating conditions of the apparatus to a different size of the upper half of a poultry carcass to process the upper half with a higher recovery rate by having a plurality of guide bars in stock which are classified by different sizes so as to be adaptable to different sizes of upper halves, obliquely moving and horizontally moving cutter blades for cutting the two pairs of tendons around the shoulder joint and the separator for widening the gap to accommodate the horizontally moving cutter blade.

It is preferable in the sixth aspect that reference pieces are mounted on the upper side of a guide bar to regulate a position the guide bar in the vertical direction when insertion by a pressing force is conducted, that is, a specified means for controlling a position of the horizontal reference plane in the vertical direction is automatically provided by a guide bar selected according to a size of the upper half.

It is preferable in the sixth aspect that an inserting position of the obliquely moving cutter blade is controlled by a guide bar, that is, a specified member for automatically controlling an inserting position of the obliquely moving cutter blade according to a size of the upper half is provided.

It is preferable in the sixth aspect that the horizontally moving cutter blade can horizontally be movable along the separator and means for automatically controlling an inserting position of the horizontally moving cutter blade according to a size of the upper size is provided.

A seventh aspect of this invention is directed to an auto-loading system for automatically loading cut-up parts of poultry carcasses (hereinafter referred to as works) to a plurality of apparatuses for separating bone and meat, characterized in that the auto-loading system comprises; a conveyor mounted with a holder thereon for holding a work; a plurality of buffer conveyors each of which receives a work to give it a short stay and transfer it to an apparatus for separating bone and meat; a plurality of transfer units each for transferring a work from the feed conveyor in running to a buffer conveyor; and a plurality of loading units each for loading a work to an apparatus for separating bone and meat.

The seventh aspect is an auto-loading system for automatically loading works mainly comprising a feed conveyor for continuously feeding the works without delay, a plurality of buffer conveyors each for giving a short stay to a work in order to effectively run as many apparatuses for separating bone and meat; transfer units for effectively connecting the feed conveyors and buffer conveyors, and loading unites for effectively connecting the buffer conveyor and apparatuses for separating bone and meat.

It is preferable in the seventh aspect that a transfer unit is placed in a straight track section of a buffer conveyor forming parallel straight paths of travel with the feed conveyor running in straight line and the transfer unit comprises: a company-run mechanism for driving a relay hanger mounted on a buffer conveyor in an accompanying manner; a synchronous-run mechanism for driving the company-run mechanism in a synchronous manner with the feed conveyor; and a work-moving mechanism for shifting a work, wherein a transfer unit is constructed in a manner such that a work can be transferred to a buffer conveyor from the feed conveyor without stoppage of running of the feed conveyor.

It is preferable in the seventh aspect that a loading unit comprises: a linear run unit and translatable rod for translating a work held by a gripper from the relay hanger in stoppage of a buffer conveyor to an apparatus for separating bone and meat, and a guiding member.

It is preferable in the seventh aspect that a loading unit can load the cut-up part to an auto-chuck of the apparatus for separating bone and meat, which is in temporary stoppage at a predetermined position while the auto-chuck is driven intermittently, from a relay hanger of a buffer conveyor.

It is preferable in the seventh aspect that the feed conveyor comprises: chain wheels having horizontal driving shafts, a feed conveyor chain running in straight line in a vertical plane while holding a plurality of work holders; and guide rails.

It is preferable in the seventh aspect that the feed conveyor is constructed in a manner such that a plurality of transferring operations of works are effected in parallel and the track of the feed conveyor is arranged in a vertical plane so as to make a floor area for installment smaller.

It is preferable in the seventh aspect that a buffer conveyer comprises: chain wheels having vertical driving shafts; a conveyor chain for a curved track running in a horizontal plane by the chain wheels; a plurality of relay hangers which are mounted on and driven by the conveyor chain in an accompanying manner or stopped by a plurality of stoppers; and the stoppers which stop the relay hangers at predetermined positions.

It is preferable in the seventh aspect that a buffer conveyor has the most suitable structure for short stay of a work.

It is preferable in the seventh aspect that the company-run mechanism has an engaging protrusion which fits in an engaging recess formed in a relay hanger in a dismountable manner.

It is preferable in the seventh aspect that a catch member is mounted for combining the synchronous-run mechanism and a work holder in a dismountable manner.

It is preferable in the seventh aspect that the catch member is freely mounted or demounted.

A eighth aspect of this invention is directed to an auto-loading system, in which works are transferred from a feed conveyor to a plurality of buffer conveyors by way of a plurality of transfer units and automatically fed from the buffer conveyors to a plurality of apparatuses for separating bone and meat in downstream positions by loading units, characterized in that the auto-loading system comprises a control unit comprising: at least, means for selecting one of the transfer units according to a waiting situation of works; means for actuating the transfer units based on a combination of a selecting signal from the selecting means, a signal of readiness for receiving a work by a relay hanger and a signal of presence of a work on a feed conveyor; and means for actuating loading units based on a combination of readiness for receiving a work by an apparatus for separating bone and meat and a signal of presence of a work on a buffer conveyor.

It is preferable in the eighth aspect that the auto-loading system has the control unit having a special function.

BRIEF DESCRIPTION OF THE DRAWINGS

The novel features which are considered characteristic of this invention are set forth with particularity in the appended claims. This invention itself, however, additional objects and advantages thereof will best be understood from the following description of preferred embodiments thereof when read in connection with the accompanying drawings, in which:

FIGS. 3(A) to (D) are illustrations of respective progressive steps in separation of breast meat and wings on an upper half of a poultry carcass by a method for separation according to this invention;

FIGS. 4(A), (B) are illustrations of application of cuttings to a furcula portion in the separation depicted in FIG. 1, wherein, in detail, FIG. 4(A) is a perspective front view, as seen from the breast side and FIG. 4(B) is a perspective side view, as seen from the breast side;

FIGS. 7(A), (B) are detailed views of a structure of a meat separator of FIG. 6 and illustration of an pressing operation thereof, wherein FIG. 7(A) illustrates the structure and a situation when the meat separator is placed on a joint of a scapula from above to after determining an engaging location and FIG. 7(B) illustrates a situation of pressing down the head of humerus;

FIGS. 13(A), (B) are illustrations of cutting operation of two pairs of tendons in one of the apparatuses of FIG. 10, which connect the head of scapula and the head of humerus, wherein FIG. 13(A) is a view of cutting of a tendon (i) and FIG. 13(B) is a view of cutting a tendon (ii);

DESCRIPTION OF THE PREFERRED EMBODIMENTS

A first preferred embodiment of this invention will be described with reference to the accompanying drawings. It is to be understood that, unless specified, dimensions of parts, shapes thereof and relative configurations of the parts are not given to define the limits of this invention, but for the purpose of illustration only.

Figure 1:
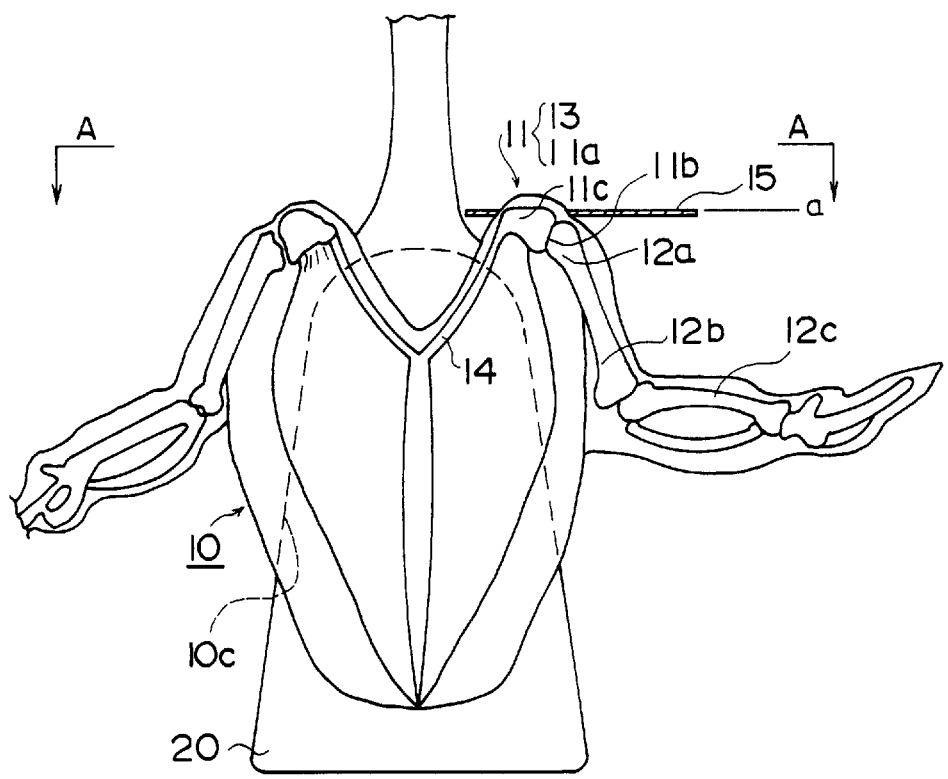
FIG. 1 is a schematic front view of a skeleton of the upper half of a poultry carcass, as seen from the breast side.
Figure 2:
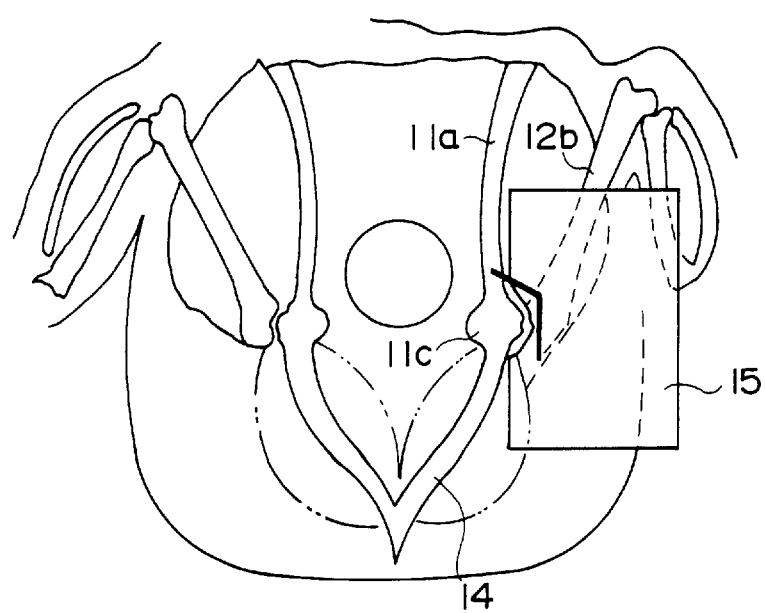
FIG. 2 is a sectional view taken along the line A—A of FIG. 1.
Figure 5:
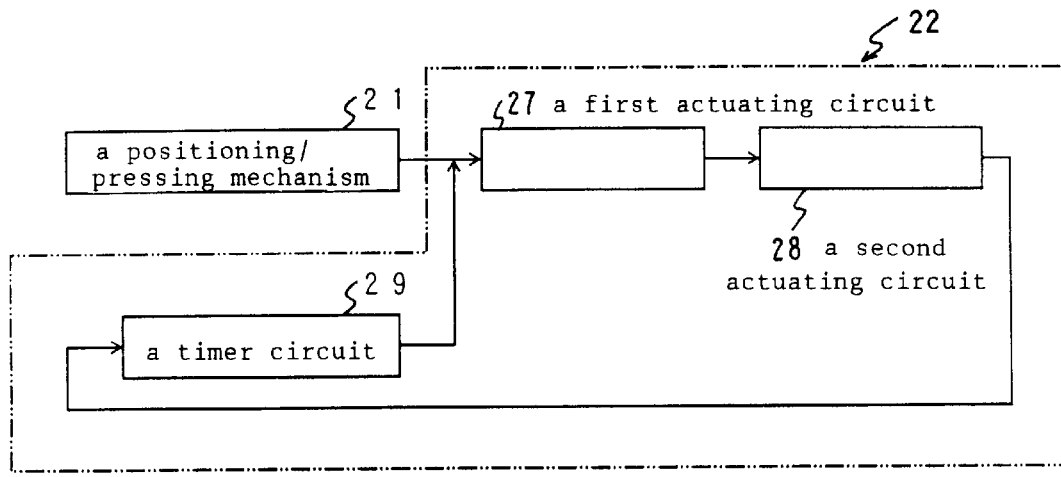
FIG. 5 is a block diagram, as an example, illustrating principal elements of an apparatus for separation of bone and meat according to this invention.
Figure 6:
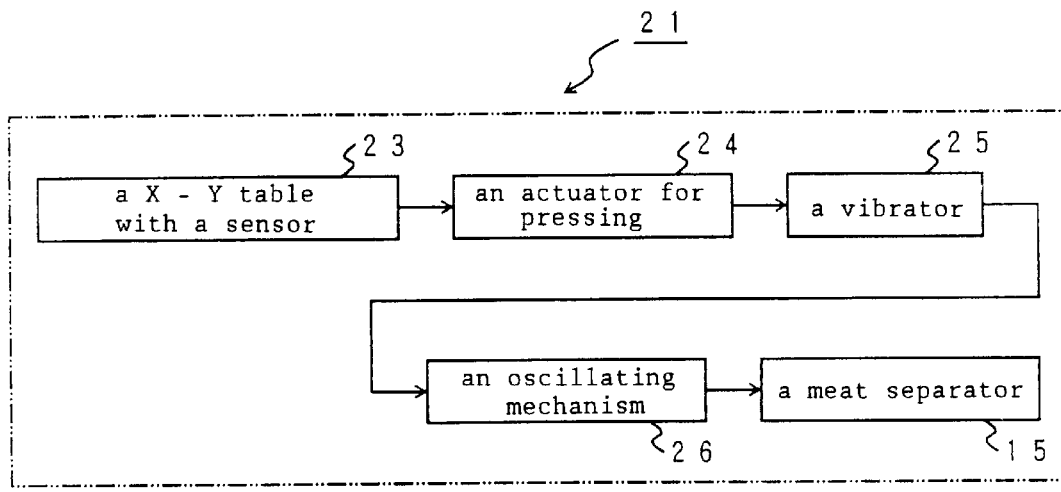
FIG. 6 is a block diagram illustrating principal elements of a positioning/pressing mechanism.
Figure 7:
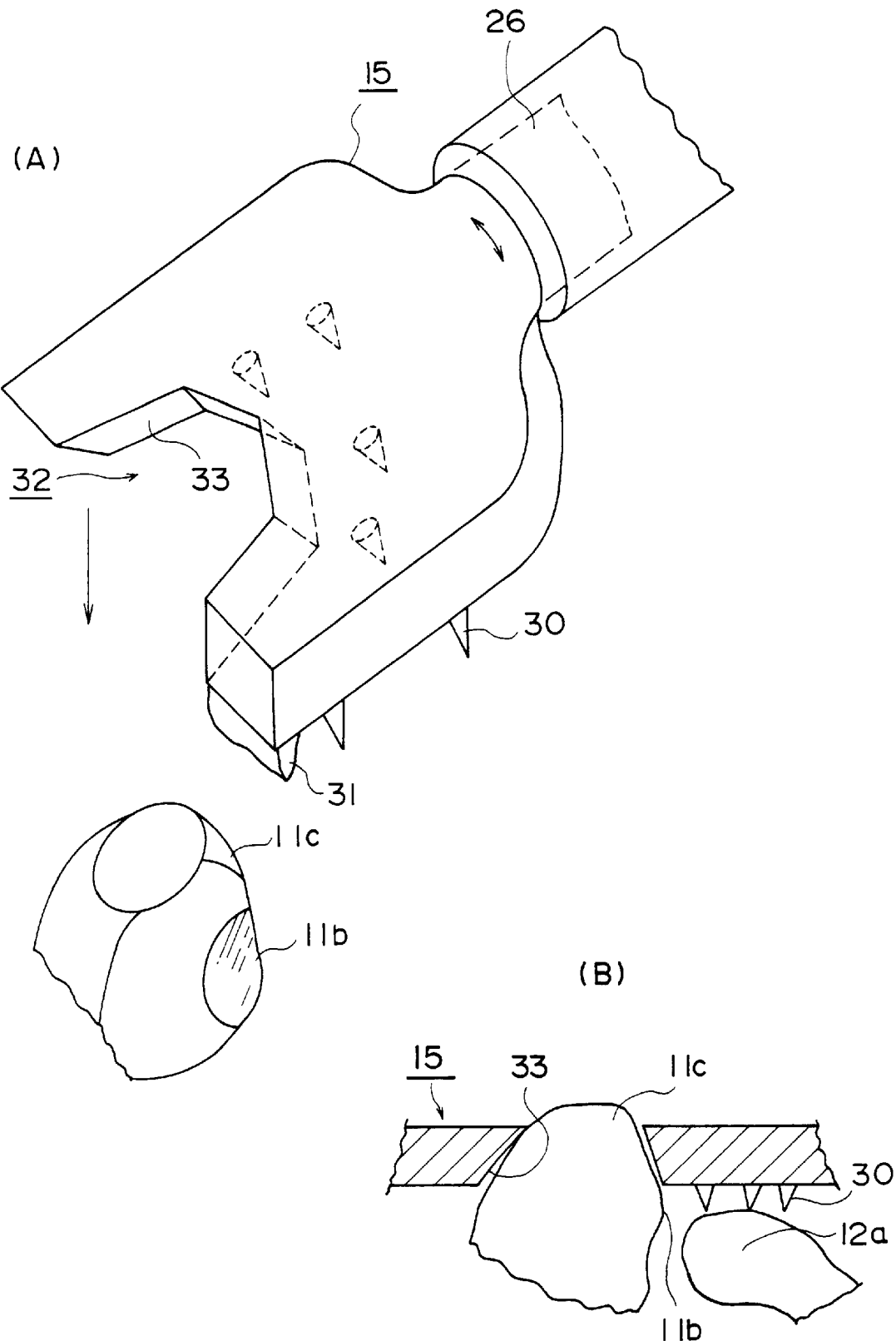
Figure 8:
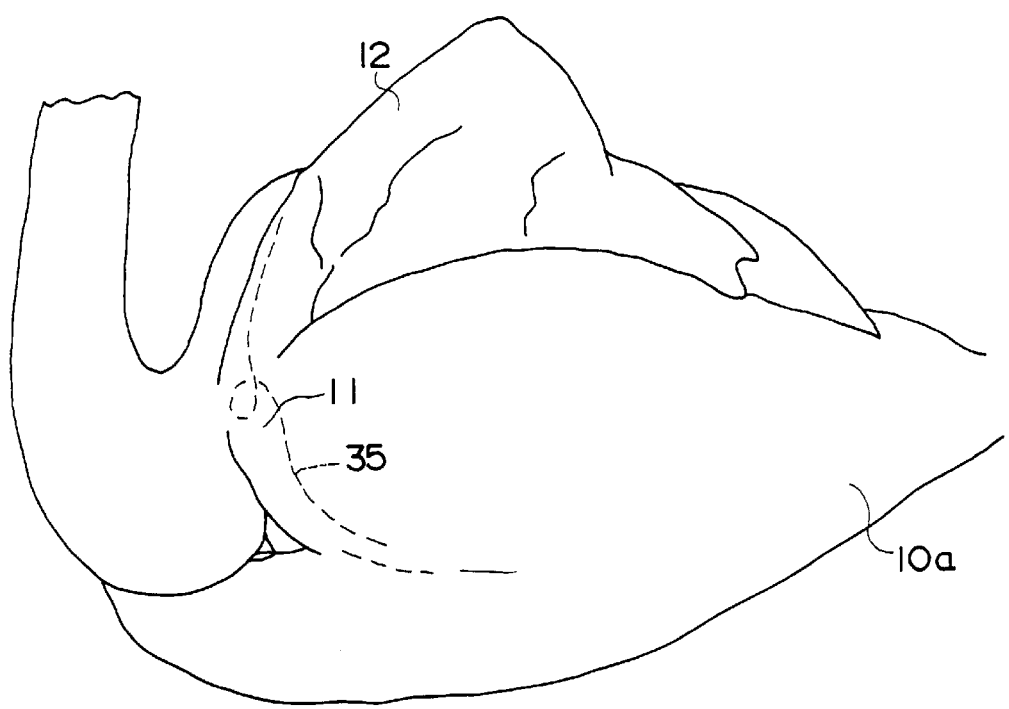
FIG. 8 is a perspective view of the upper half of a poultry carcass.
Figure 9:
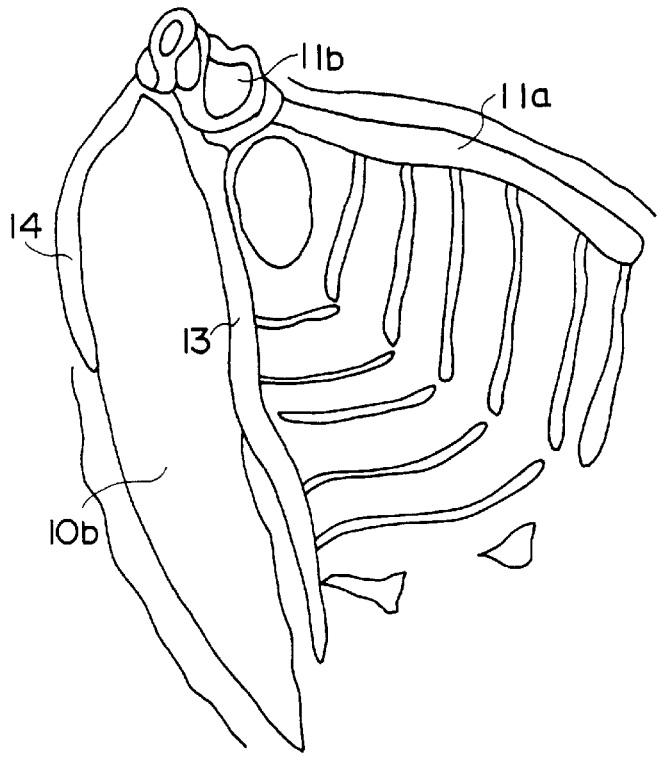
FIG. 9 is a skeleton of the upper half after the breast meat and wings are separated.

FIG. 1 is a schematic front view of a skeleton of the upper half of a poultry carcass, as seen from the breast side, FIG. 2 is a sectional view taken along the line A—A of FIG. 1, FIGS. 3(A) to (D) are illustrations of respective progressive steps in separation of breast meat and wings on an upper half of a poultry carcass after muscles have been cut by a method for separating bone and meat shown in FIG. 1, FIGS. 4(A), (B) are illustrations of application of cuttings to a furcula portion in the separation, wherein, in detail, FIG. 4(A) is a perspective front view, as seen from the breast side and FIG. 4(B) is a perspective side view as seen from the breast side, FIG. 5 is a block diagram, as an example, illustrating principal elements of an apparatus for separation of bone and meat according to this invention, FIG. 6 is a block diagram illustrating principal elements of a positioning/pressing mechanism of FIG. 5, FIGS. 7(A), (B) are detailed views of a structure of a meat separator of FIG. 6 and illustration of an pressing operation thereof, wherein FIG. 7(A) illustrates the structure and a situation when the meat separator is placed on a joint of a scapula from above to after determining an engaging location and FIG. 7(B) illustrates a step of pressing down the head of humerus.

A method for separating bone and meat of an upper half of a poultry carcass, as shown in FIGS. 1, 2, comprises the following steps of:

(1) inserting a truncated cone 20 for holding fast in an upper half 10 of a poultry carcass into a cavity 10c thereof; adjusting a position of a shoulder joint 11, which comprises a glenoid 11b of a scapula 11a, on the top of which a furcula 14 and an os coracoideum 13 are present, and the head 12a of a humerus 12b engaged in the glenoid 11b; and (2) pulling down an ulna 12c and the humerus 12b to separate the head 12a of the humerus 12b from the glenoid 11b of the scapula 11a, which is located in the upper portion of the shoulder joint 11.

The above-mentioned separating force works so as to widen a gap between a glenoid 11b of a scapula 11a and the head 12a of a humerus 12b and thereby facilitate cuttings of ligaments and envelops, which connect the glenoid 11b of the scapula 11a and the head 12a of the humerus 12b, and breast muscles, tendons and the like, which connect to the joint portion of the scapula 11a. The center of action of the force resides at a point between the scapula 11a and glenoid 11b. A direction, along which the force acts, is not necessarily restricted to a single direction, but is properly changeable according to types of tissues, which are objects to cut, and procedures adopted.

Besides, the separating force may directly acts on the head 12a of the humerus 12b and indirectly on the head 12b through the humerus 12b or the ulna 12c.

The method for separating bone and meat further comprises the steps of:

(3) following the step (2), shifting downward a meat separator 15 from an original position a toward another position b, a little lower the original position, by the separating force; directly pressing down the head 12a of the humerus 12b in contact therewith to relatively raise the joint 11c of the scapula 11a upward, as shown in FIGS. 1, 2, wherein a caution should be taken not to break the furcula 14 by adversely pressing it with the meat separator 15;

(4) effecting cutting along the periphery of the raised joint 11c of the scapula 11a in such a manner that the cutting reaches a bone by the cutter blade 16 to disconnect a joint envelop and thereby expose the joint 11c (see FIG. 3(A)), wherein the cutting by the cutter blade 16 is effected along the periphery of the joint 11c of the scapula 11a with the meat separator 15 remained at the original position a in the figure;

(5) moving the head 12a of the humerus 12b by the meat separator 15 downward with a caution not to press the exposed joint 11c of the scapula 11a to widen a space between the glenoid 11b of the joint 11c and the head 12a of the humerus 12b (see FIG. 3(B));

(6) inserting the cutter blade 16 in a widened space between the joint 11c of the scapula 11a and the head 12a of the humerus 12b to disconnect the tissues like ligaments (see FIG. 3(B)), wherein meat can be forced out outside the meat separator 15 by a press-down action and as a result, there are chances that damages by cuts are given in the meat, but, according the method or apparatus of this invention, there is provided with a structure wherein the meat separator 15 does not work in that way;

(7) repeating the steps 5, 6 to force the head 12a of the humerus 12b down to the position c from the position a of FIG. 1 by the meat separator 15; disconnecting all the muscles between the joint 11c of the scapula 11a and the head 12a of the humerus 12b (see FIGS. 1, 3(C));

(8) then pulling the humerus 12b and the ulna 12c toward the cone 20 to strip and separate the breast meat 10a from bones of the upper half, wherein, if cutting is effected in a area 14a hatched with oblique lines on the front side of the furcula 14 except for the peripheral portion around the shoulder joint 11, the stripping and separation can be in a smoother manner carried out.

The cutting in the hatched area is, in detail, carried out in such a method comprising the steps of: pressing a round cutter blade 36, rotary or stationary, to both branches of a V letter in shape of the furcula 14 at the same time, as seen in the perspective front view of FIG. 4(A) and in the perspective side view of FIG. 4(B); and moving the edge of the cutter blade 36 from the roots of the furcula in the shoulder to a joining point of both branches along a direction of an arrow D, as if the edge scrape meat on the furcula 14 off, to apply cutting for a distance C, which is effective in reducing residual meat between both branches of the furcula 14.

In this case, residual meat in a furcula portion can be less and a recovery rate is improved in separating breast meat from bones, which is effected by tearing the breast meat apart.

In FIG. 5, there is provided a block diagram, as an example, illustrating principal parts of an apparatus for separating bone and meat of this invention. The apparatus comprises a positioning/pressing mechanism 21 and a control circuit 22 for repetition, the latter of which comprises a first actuating circuit 27 for a pressing force, a second actuating circuit 28 for a cutter, and a timer circuit 29 for repetition, wherein the positioning and pressing 21 determines a position of pressing by the meat separator 15, the meat separator 15 is pressed, then a cutter blade 116 is driven to cut and a control unit for repetition 22 makes the pressing and cutting in combination repeated in a desired number of times.

The positioning/pressing mechanism 21 comprises: a X-Y table 23 with a sensor; an actuator 24 for pressing; and a meat separator 15 with a vibrator 25 and an oscillating mechanism 26, wherein the meat separator 15 with the oscillating mechanism 26 detects, with the help of the X-Y table 23 having the sensor, a position where the meat separator 15 can engage with the joint 11c of the scapula 11a, which is the shoulder joint 11 and the meat separator 15 can press down the head 12a of the humerus 12b by means of the actuator 24 for pressing after determining the position of engagement.

The meat separator 15 has the oscillating mechanism at its root, as shown in FIG. 6, so as to be adaptable for a oblique plane in pressing. The meat separator can fast bite the head 12a of the humerus 12b by the action of a plurality of spikes 30 planted on the lower side, which is later detailed, and downwardly pointed edges integrally formed at the fore end of the meat separator 15 in cooperation with the action of the vibration having a proper wavelength caused by the vibrator 25.

As described before, the meat separator 15 is a profiled plate, as shown in FIG. 7(A), wherein the fore end has a concave opening 32 increasing in width toward the fore end and the concave opening 32 has sides 33 of tapered surfaces to secure engagement in the joint 11c of the scapula 11a and thereby facilitate the detection of position, as shown in FIG. 7(B).

Besides edges 31 are integrally formed at the fore edge on the lower side and a plurality of spikes 30 are planted across the surface of the lower side to secure the press-down of the head 12a of the humerus 12b.

The cutter blade 16 is, for example, a small-diameter rotary blade rotating in a horizontal plane, moves along the meat separator 15, as a guide, in a proper contact and is adaptable to cutting along any desirable direction, so that tissues such as a tendon, ligament, muscle, envelope and the like around a shoulder joint can be cut in a smoother manner.

According to the first embodiment above mentioned, upper halves of poultry carcasses are processed to easily separate meat and bone without any damages on recovered meat and therefore improvement on a recovery rate can be achieved.

A second preferred embodiment of this invention will be given with reference to the accompanying drawings.

Figure 10:
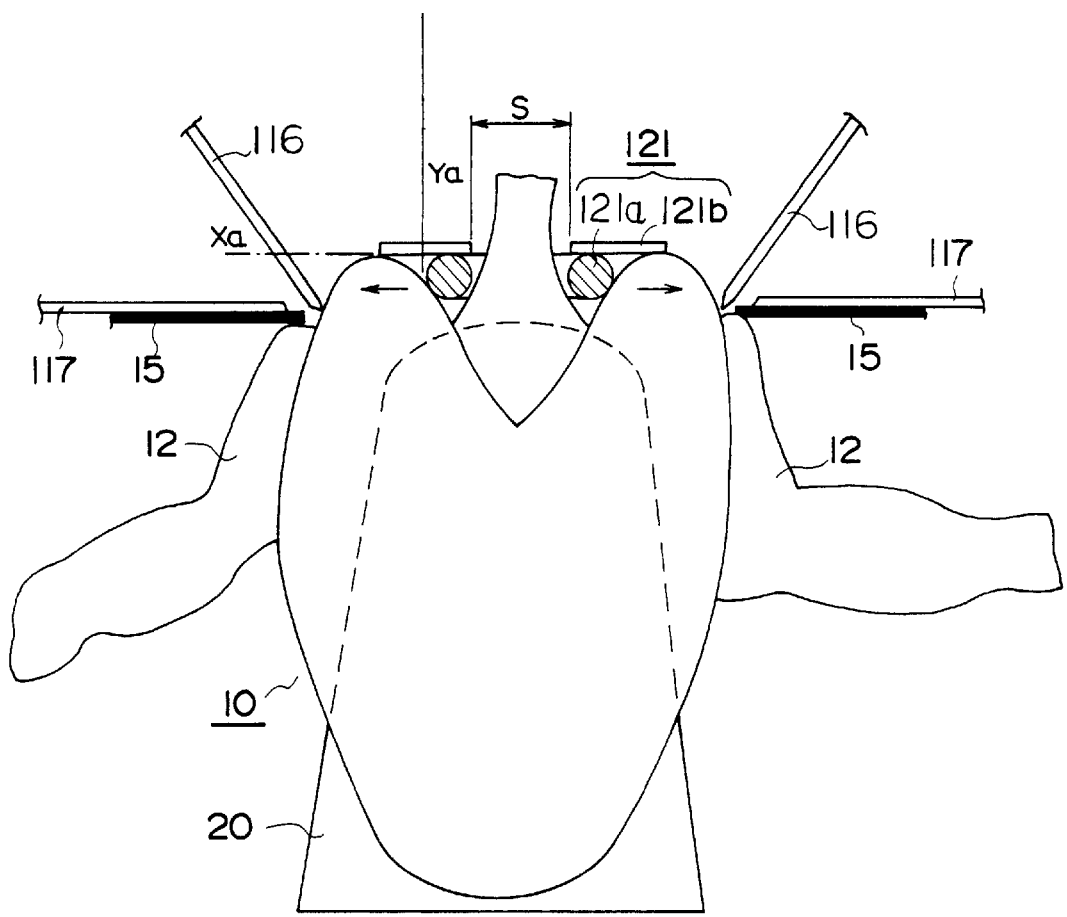
FIG. 10 is an schematic illustration of principal parts of an apparatus for separating bone and meat which automatically adapt itself to a size of the upper half of a poultry carcass according to a method of this invention.
Figure 11:
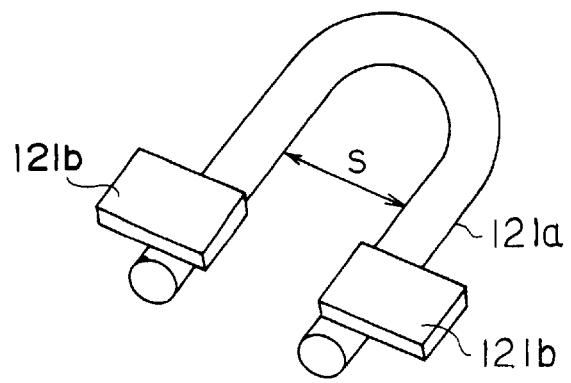
FIG. 11 is a perspective view of a guide bar of FIG. 10.
Figure 12:
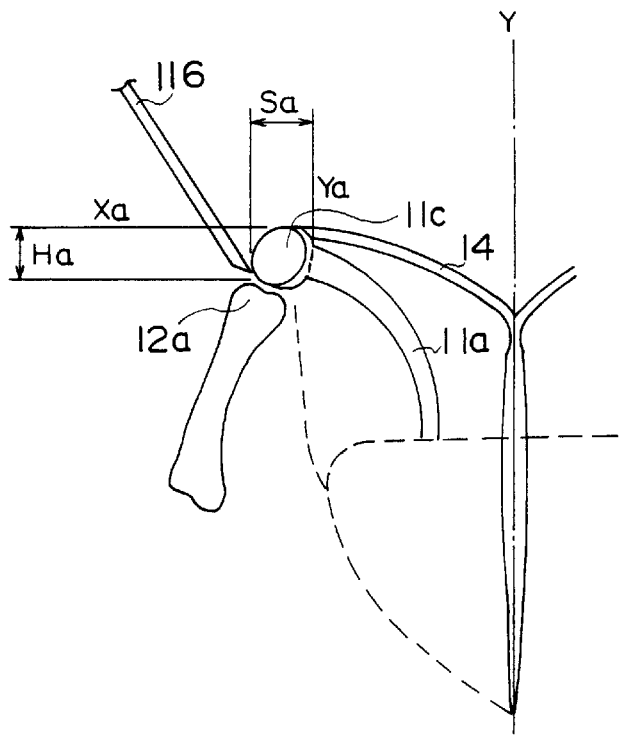
FIG. 12 is an illustration of positional relations of a cutter blade of FIG. 10 ready for insertion.
Figure 13:
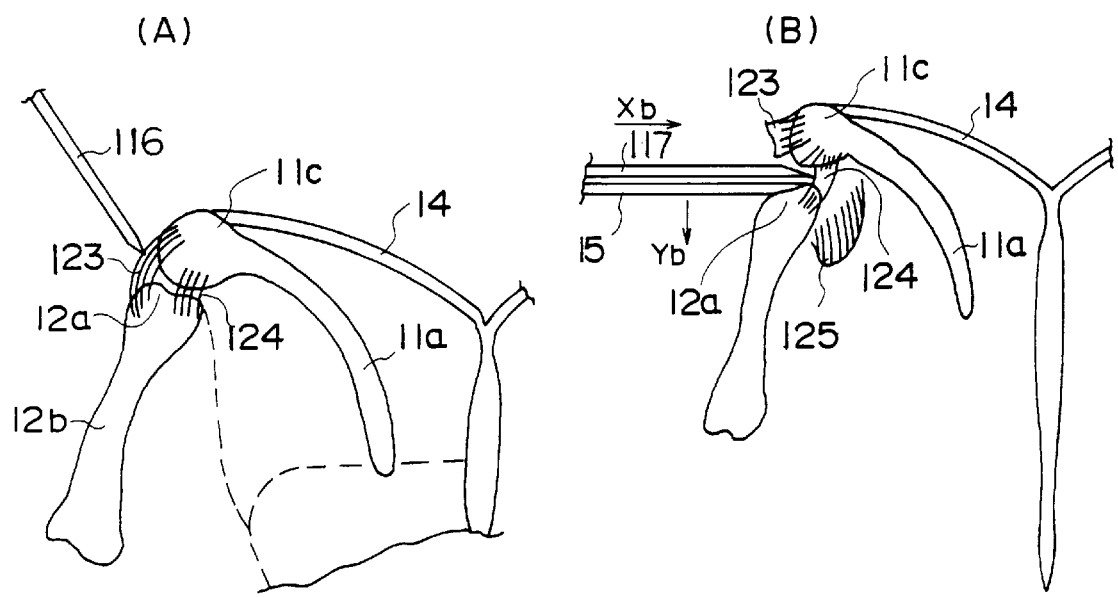
Figure 14:
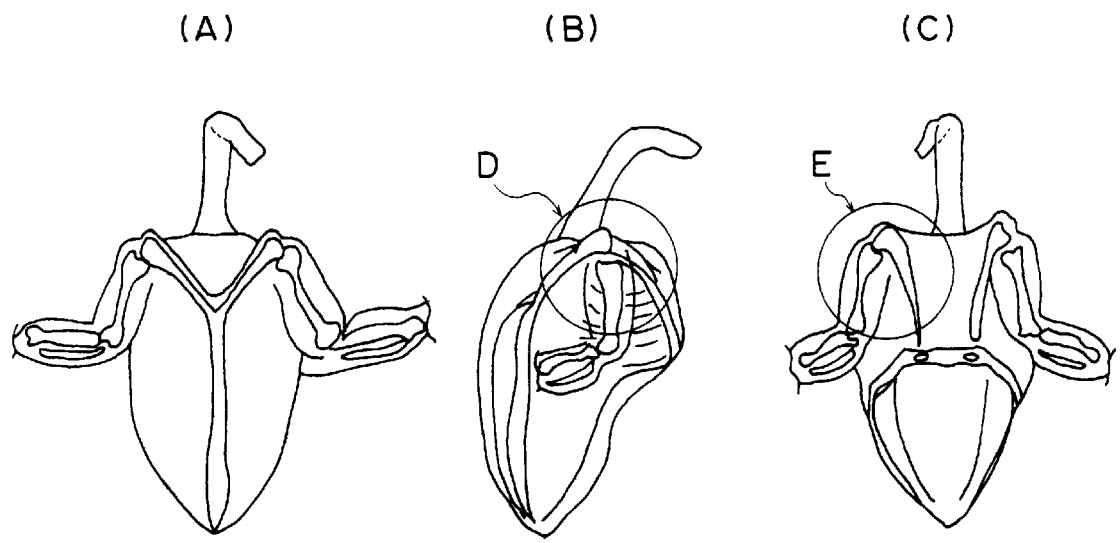
FIGS. 14(A), (B), (C) are a front view, side view and rear view of a skeleton, as seen from the breast side.
Figure 15:
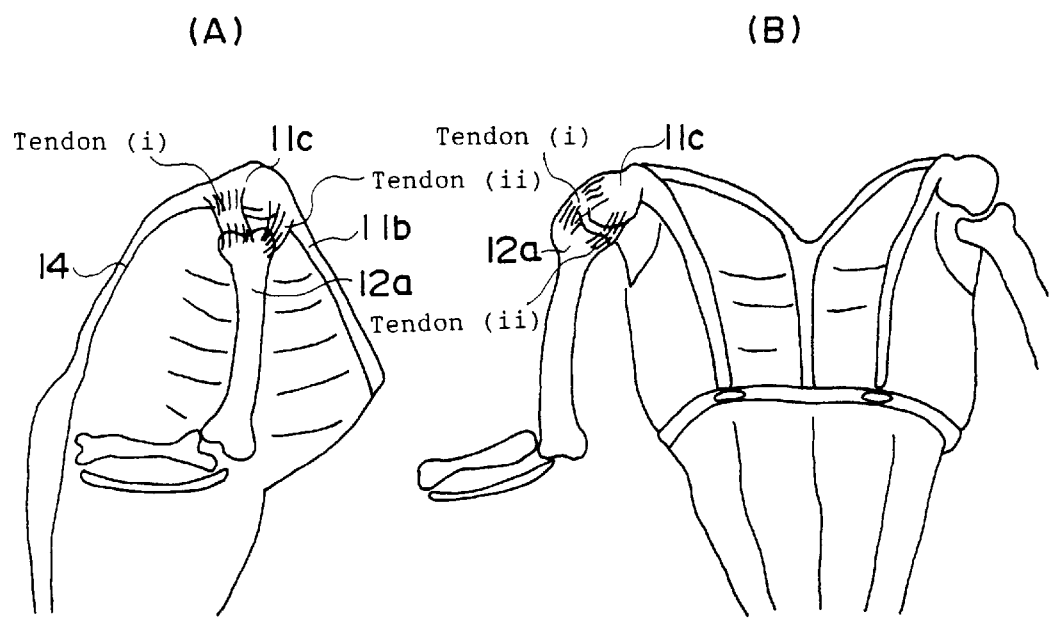
FIGS. 15(A), (B) are enlarged side views respectively of a portion in a circle D around a shoulder joint shown in FIG. 14(B) and a portion in a circle E around the shoulder joint shown in FIG. 14(C)

FIG. 10 is an schematic illustration of principal parts of an apparatus for separating bone and meat which automatically adapt itself to a size of the upper half of a poultry carcass according to a method of this invention, FIG. 11 is a perspective view of a guide bar illustrating an outline of a structure, FIG. 12 is an illustration of positional relations of a cutter blade ready for insertion, wherein the cutter blade changes its starting position for inserting according to a size of the upper half, and FIG. 13(A), (B) are illustrations of cutting operation of two pairs of tendons which connect the head of scapula 11a and the head 12a of humerus 12b, wherein FIG. 13(A) is a view of cutting of a tendon (i) and FIG. 13(B) is a view of cutting a tendon (ii).

A method and apparatus of this invention are automatically adapted to a change in a size of the upper half of a poultry carcass, wherein a starting position and finishing depth of cutting in the body of the upper half for a cutter blade is changeable according to differences in size of the upper half as a work when the cutting is applied around a shoulder Joint and the cutting is an important factor to determine a recovery rate, that is, better selections of the position and depth of the cutter blade in the body of the upper half are automatically resulted in a good recovery rate.

The present invention is, accordingly, to enable the cutter blade to properly adjust a position before and depth after insertion thereof in the body of a work in a flexible manner in accordance with a size of the work regardless the magnitude of the size.

As shown in FIG. 12, a starting position for insertion of a obliquely moving cutter blade 116 is set at a point of a lateral outward distance of Sa from a vertical reference plane Ya and at a vertical downward distance Ha of Ha from a horizontal reference plane Xa, wherein the vertical reference plane Ya is positioned on the inside of a shoulder joint 11 and the horizontal reference plane Xa is positioned on the upper side of the shoulder joint 11.

Magnitudes of the Sa and Ha have a small spread of variation falling in the range of 2 to 3 mm according to variations in magnitude of sizes of the head 11c of a scapula 11a and therefore the spreads of variations in magnitude of the Sa and Ha can be said to be affected at a relatively minor level by the variations in magnitude of sizes of the upper half.

In this invention, on the basis of the above observations, a plurality of guide bars 121 are prepared beforehand, as shown in FIG. 10, which guide bars have respective different values of S in a proper range according to conceivable different sizes of upper halves, for the purpose to especially absorb influence of a magnitude in size of an upper half on setting of a reference plane, especially a vertical reference plane Ya.

A magnitude of S of a guide bar 121 is selected on the basis of a size of the upper half and moreover, reference pieces 121b, 121b are mounted on the upper side of the guide bar 121, which are used for proper positioning in height of the guide bar 121 and thereby a horizontal reference plane Xa.

When a guide bar 121 is applied to an upper half, a proper S of the guide bar 121 is selected from the stock in accordance to a size of the upper half and a guide bar 121 with the S is inserted and pressed, in a widening manner in a direction of an arrow, inside shoulder joints of the upper half to set a vertical reference plane Ya and at the same time set a horizontal reference plane Xa by the help of reference pieces 121b, 121b.

A mechanism for an obliquely moving cutter blade 116 to obliquely slide (not shown) is mounted on the guide bar 121 and by the mechanism, the edge of the obliquely moving cutter blade 116 is always positioned at a position of Sa and Ha respectively from the reference planes, vertical and horizontal, when starting. The mechanism, in such a manner, enables proper positioning of the obliquely moving cutter blade 116 to be secured.

According to a method and apparatus of this invention, tendons connecting the head 11c of a scapula 11a and the head 12a of a humerus 12b are cut by a two-stage cutting with an obliquely and horizontally moving cutter blades 116, 117, since a tendon (i) 123 extends from the head 11c of the scapula 11a to the head 12a of the humerus 12b obliquely outwardly and a tendon (ii) 124 extends between both head 11c, 12a almost vertically inside the tendon (i) 123, as shown in FIG. 13(A).

A cutting process comprises the steps of: effecting a first cutting to disconnect all the tendon (i) 123 and part (2/3) of the tendon (ii) 124 by the obliquely moving blade 116; shifting the head 12a of the humerus 12b, which is bonded in a weaker manner, downward along a direction of Yb by a separator 15; and then effecting a second cutting along the surface of the separator 15 in a sliding manner to completely disconnect the rest of the tendon (ii) 124 by the horizontally moving blade 117. In the second cutting stage, a horizontal cutting is adopted and therefore, the edge of the cutter blade 117 is stopped at the surface of a bone, before the edge of a cutter blade gives damages to the neighboring meat 125, as shown in FIGS. 13(A), (B).

In such a way as has been described above, a method of this invention makes it possible to conduct the cutting around a shoulder joint by cutter blades without any damages given on meat, while automatically adapting cutting conditions to a variation in size of upper halves and thereby, makes it possible to separate breast meat from bones together with wings by a separating mechanism with a higher recovery rate.

FIG. 10 shows main components and arrangement thereof in an outline of an apparatus for separating bone and meat according to this invention, which is automatically adapted to a magnitude in size of the upper half of a poultry carcass. The apparatus comprises: an inserting cone 20 for holding fast the upper half 10; a plurality of guide bars 121 with different openings in size; an obliquely moving cutter blade 116; a separator 15; a horizontally moving cutter blade 117; and a separating mechanism not shown.

A guide bar 121 comprises a round rod 121a having the shape of a letter U, which has an opening of a width S at its open end, and reference pieces 121b, 121b at the open end of the upper side, as shown in FIG. 11. Guide bars 121 of different openings in size are prepared in stock.

A guide bar 121 may have a variety of shapes, which comprise shapes of not only an English letter U but an English letter V and a Greek letter π and a round rod 121a may be replaced by a square rod, a plate or a tube.

A mechanism for an obliquely moving cutter blade 116 to obliquely slide is mounted on a pair of straight portions of a guide bar 121 and with a proper guide bar 121, an obliquely moving cutter blade 116 can be guided to cut into a work at a right position of a new set of Sa and Ha, which are determined by reference planes, vertical and horizontal, Ya, Xa newly set by insertion and pressing of a selected guide bar 121.

A separator 15 comprises a horizontal plate member with a concave opening 32 (see FIGS. 10, 13) at its fore end and the opening 32 engages with the head 11c of a scapula 11a, and the head 12a of a humerus 12b is pressed down along a direction of an arrow Yb by the bottom portion of the opening 32, the head 12a of humerus 12b having already been weakened in bonding strength with a partner in the first cutting.

The horizontally moving cutter blade 117 can slide on the separator 15 along a horizontal direction of an arrow Xb.

The separating mechanism is so constructed to be downwardly operated manually or with mechanical force in order to move the breast meat and wings downward, after the cuttings at the shoulder joint 11.

According to the first embodiment above mentioned, upper halves of poultry carcasses are processed to separate meat and bone without any damages on recovered meat, wherein the separation is easily automatically adaptable to variations in size of the upper halves regardless a variety of sizes of the upper halves, and therefore improvement on a recovery rate can be achieved.

A third preferred embodiment will be described with reference to the accompanying drawings.

Figure 16:
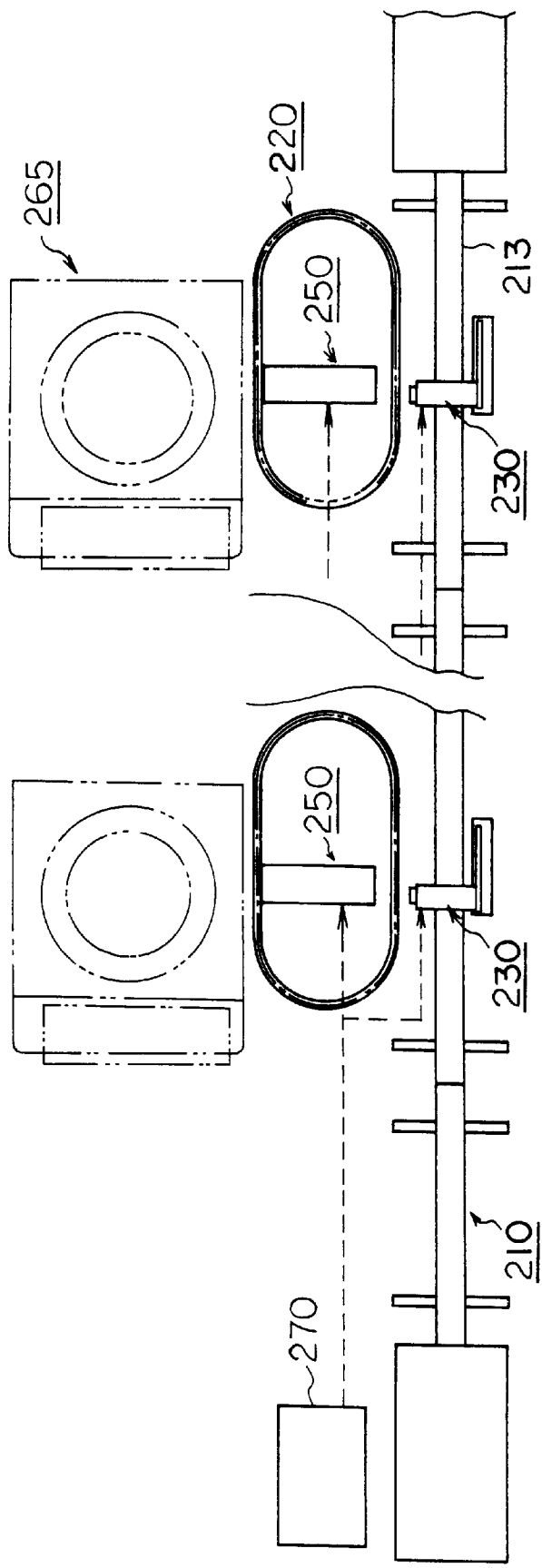
FIG. 16 is a schematic plan view of an auto-loading system for separating bone and meat of cut-up parts of a poultry carcass.
Figure 17:
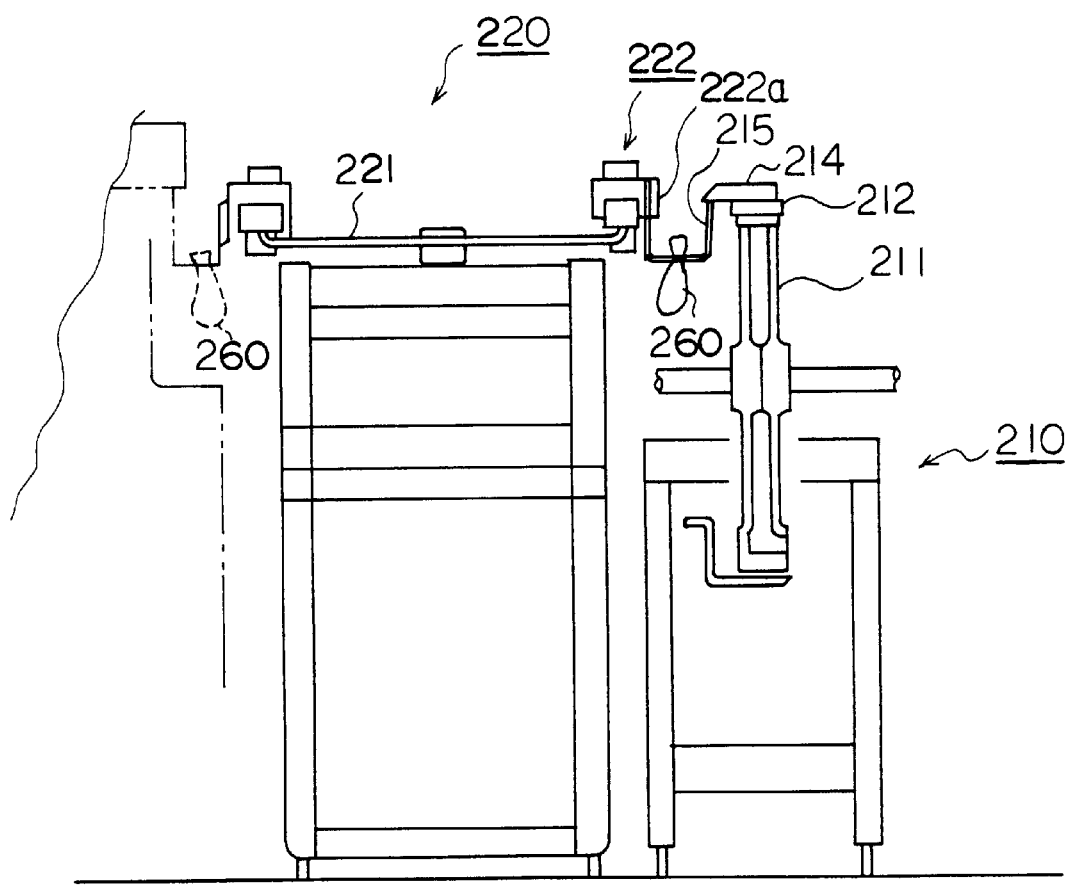
FIG. 17 is a schematic view in traverse section of the auto-loading system of FIG. 16.
Figure 18:
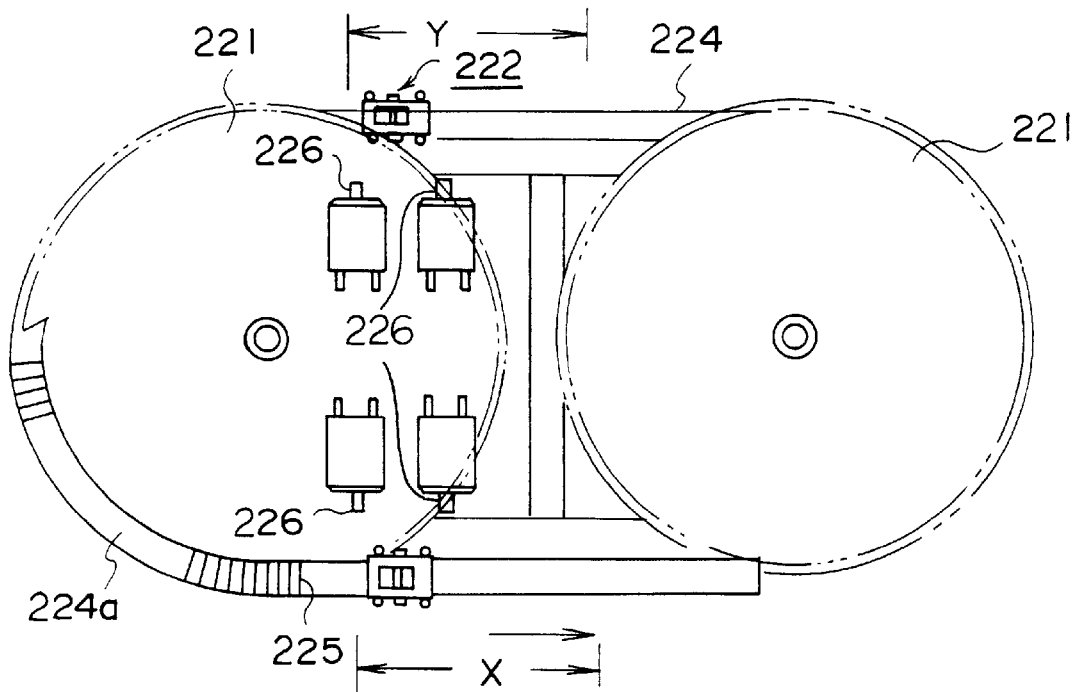
FIG. 18 is a schematic plan view of a buffer conveyor of FIG. 16.
Figure 19:
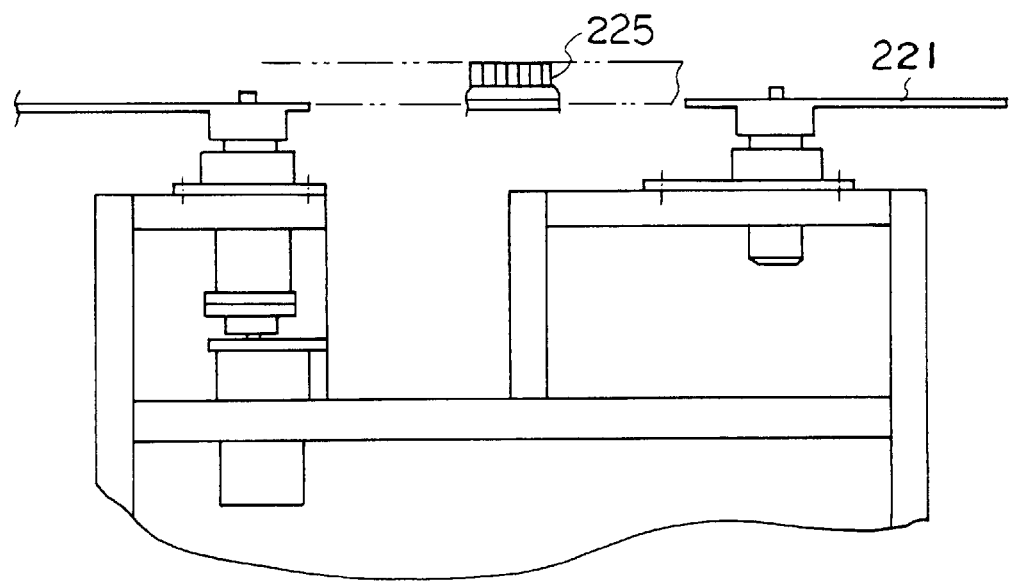
FIG. 19 is a schematic view in traverse section of the buffer conveyor of FIG. 18.
Figure 20:
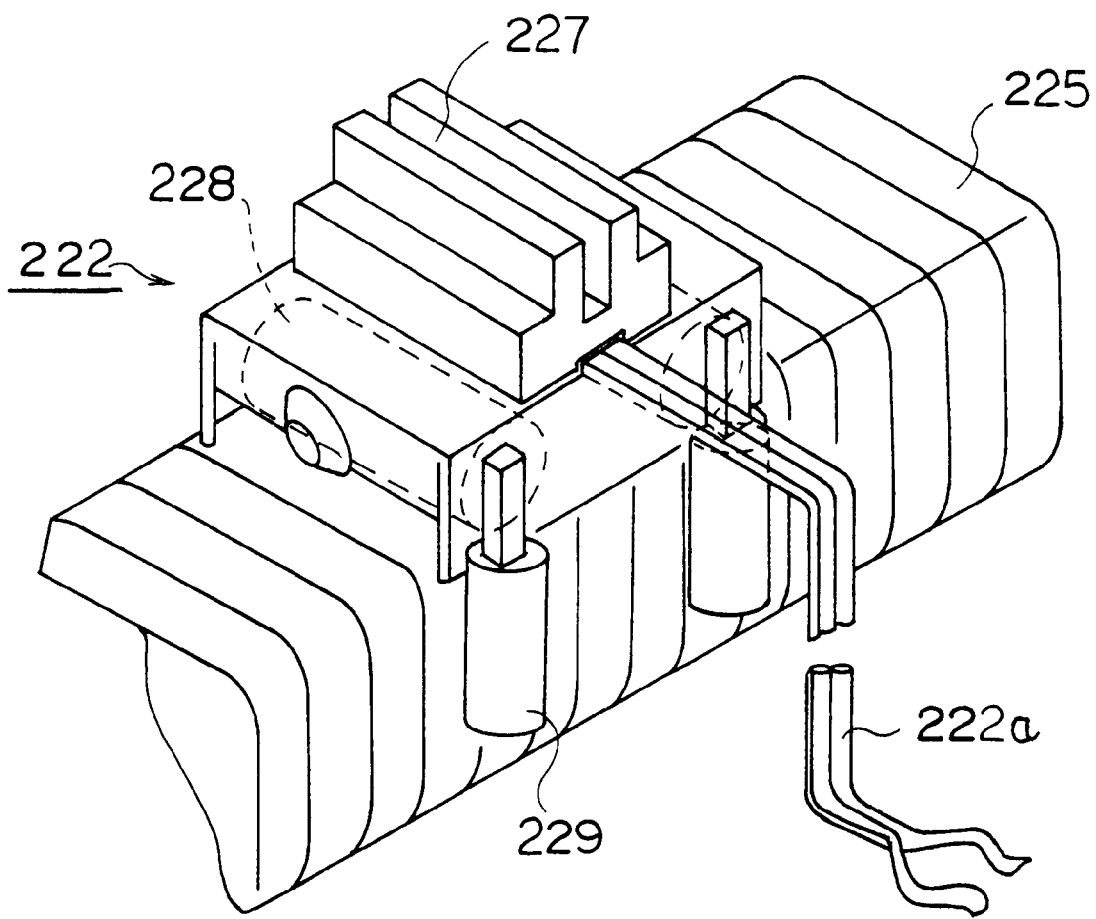
FIG. 20 is a schematic perspective view illustrating principal parts of a relay hanger of FIG. 19.
Figure 21:
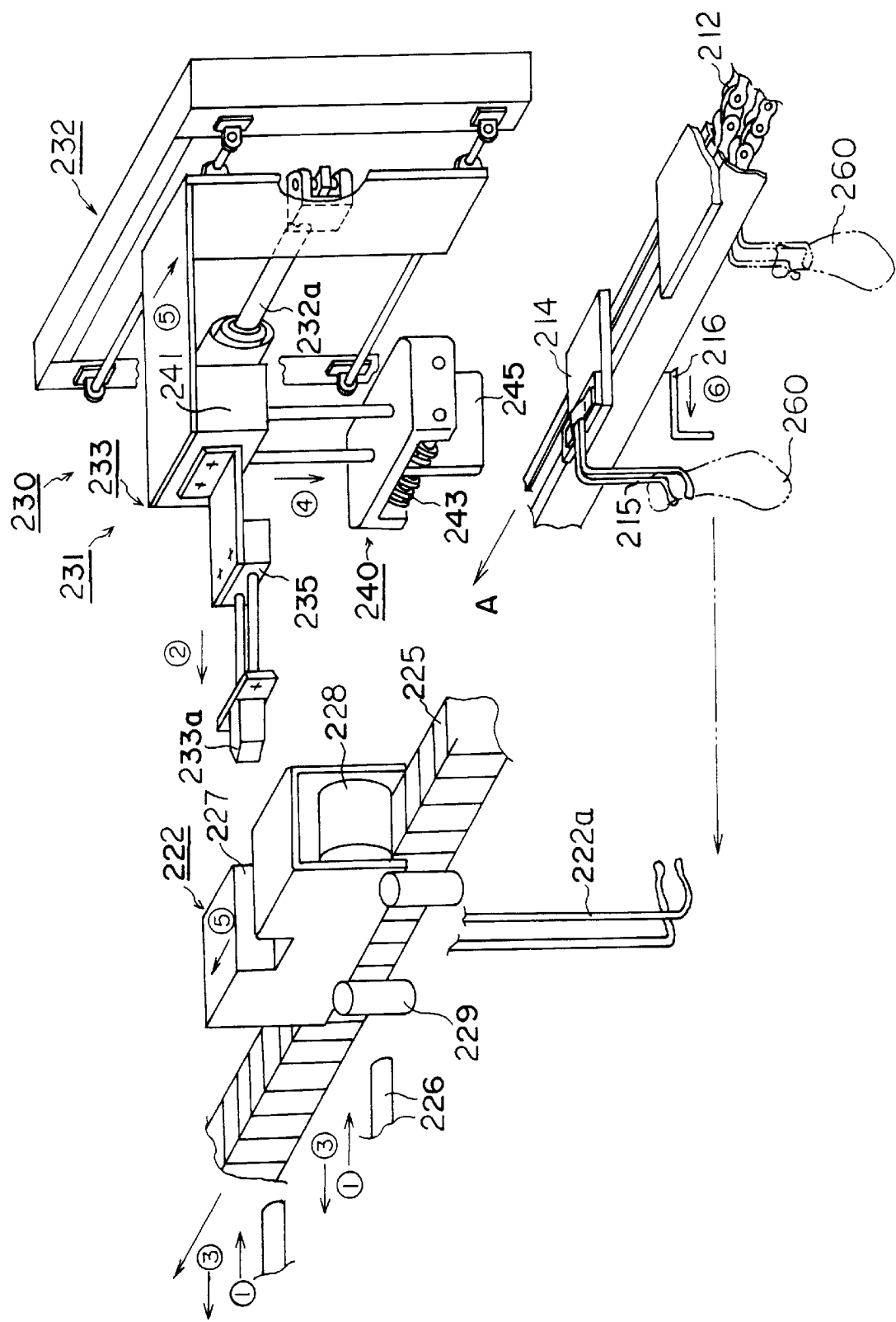
FIG. 21 is a schematic, exploded view in a perspective manner illustrating a transfer unit of FIG. 16.
Figure 22:
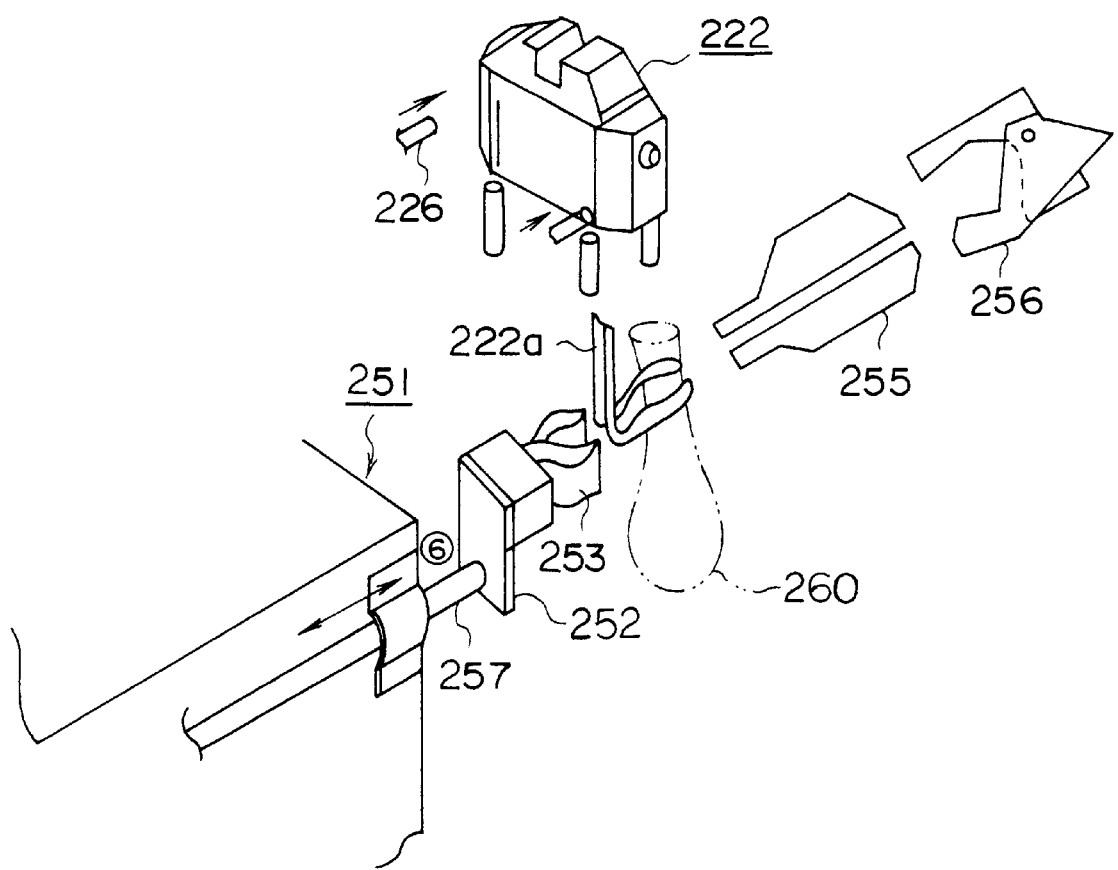
FIG. 22 is a schematic, exploded view schematically in a perspective manner illustrating a loading unit of FIG. 16.
Figure 23:
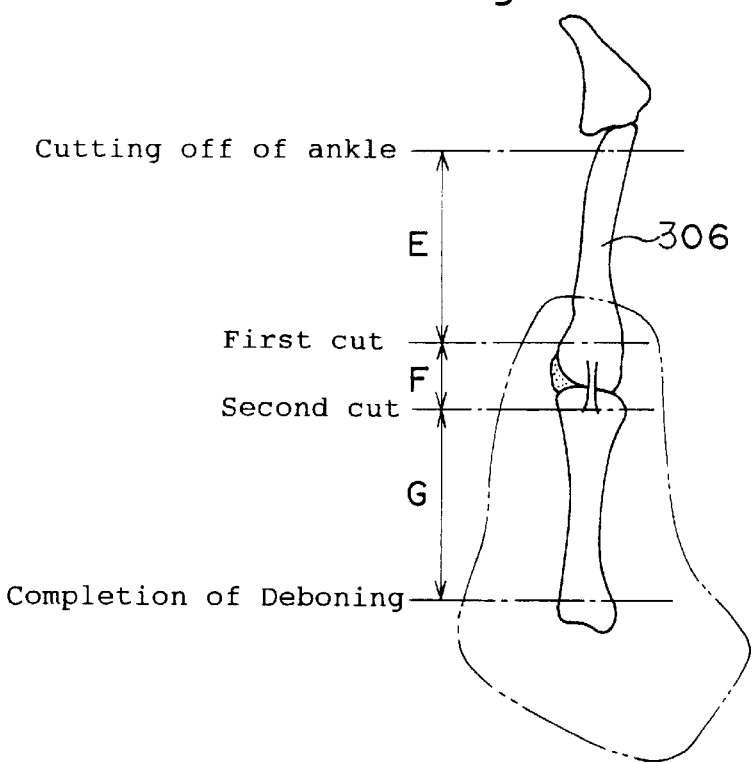
FIG. 23 is a schematic illustration of details of a leg of a poultry carcass.
Figure 24:
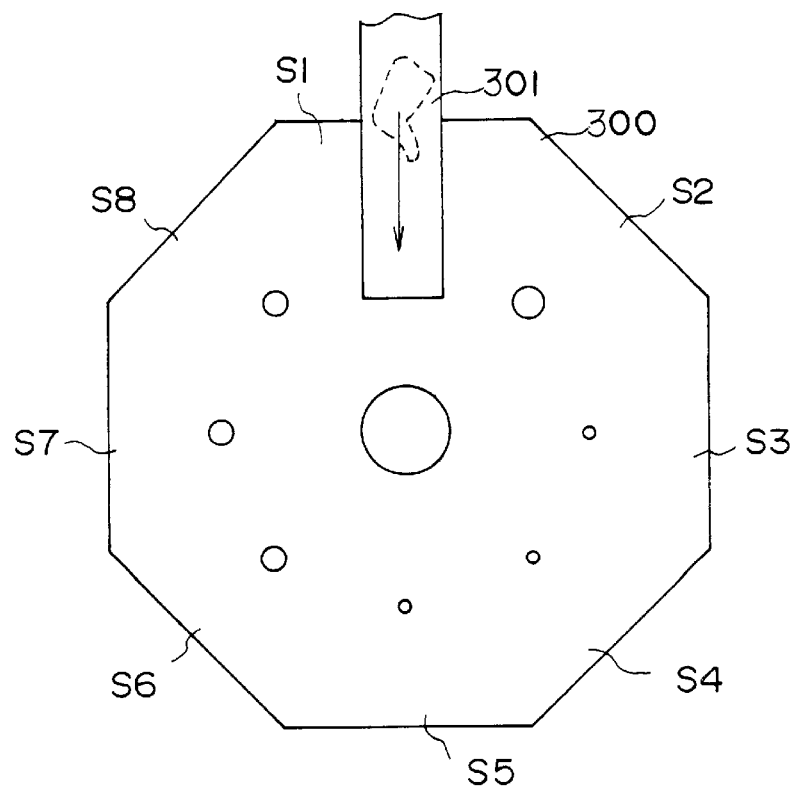
FIG. 24 is a schematic illustration of a conventional apparatus for separating bone and meat.

FIG. 16 is a schematic plan view of an auto-loading system for separating bone and meat of cut-up parts of a poultry carcass, FIG. 17 is a schematic view in traverse section of the auto-loading system of FIG. 16, FIG. 18 is a schematic plan view of a buffer conveyor of FIG. 16, FIG. 19 is a schematic view in traverse section of the buffer conveyor of FIG. 18, FIG. 20 is a schematic perspective view illustrating principal parts of a relay hanger of FIG. 19, FIG. 21 is a schematic, exploded view in a perspective manner illustrating a transfer unit of FIG. 16, FIG. 22 is a schematic, exploded view in a perspective manner illustrating a loading unit of FIG. 16.

An auto-loading system for upper halves of a poultry carcass (hereinafter referred to as work) of this invention comprises: a feed conveyor 210; a plurality of buffer conveyors 220; a plurality of transfer units 230; a plurality of loading units 250, wherein the transfer units 230 have the buffer conveyors 220 and the loading units 250 respectively in downstream positions. Apparatuses 265 for separating bone and meat (hereafter referred to deboner) are connected with respective loading units 250.

Works 260 are transported by a feed conveyor 210, a work 260 in transportation is transferred to a buffer conveyor 220 with a transfer unit 230, the transferred work 260 stays for a short time for awaiting a point in time when the work 260 is to be further transferred and then the waiting work 260 is fed to a deboner 265, which is operated in an intermittent manner, through a loading unit 250, so that the deboner 265 can be operated with almost no downtime.

An operation of the auto-loading system for the upper halves is controlled by a control unit 270, as shown in FIG. 16.

The feed conveyor 210, as shown in FIG. 17, comprises two pairs of chain wheels 211, 211 with horizontal axles of rotation, which are driven in vertical planes, an endless chain 212 and a guide rail. The endless chain 212 of the conveyor 210 runs on its track, wherein the endless chain 212 travels in a straight path in a vertical plane to an end of the straight path, revolves in half a circle path after the end, then travels back in another straight path and a plurality of work holders 215 is fast held on the chain to move at the same speed as a predetermined speed of the chain 212.

A buffer conveyor 220, as shown in FIGS. 17 to 19, comprises: a chain wheel 221 rotated by a vertical axle in the same horizontal plane as the buffer conveyor 220; an endless crescent chain 225 adaptive to curved tracks 224a formed in a horizontal plane; a plurality of relay hangers 222, which runs together with the chain 225 as far as an external force does not act on a relay hanger 222, but which stops, when the external force, for example an external force by a stopper 226, acts on it; and a plurality of hangers 222.

A relay hanger 222, as shown in FIG. 20, comprises: horizontal rollers 228, 228 included therein, which contact with the upper side of the chain 225, and which bear the weight of the upper portion of the relay hanger 222; two pairs of vertical rollers 229, 229, 229, 229, which contact with both sides of the chain 225, and which restrict side-way movement of the relay hanger 222 to locate it in a right position; and an engaging recess 227 on the top thereof; and a clip 222a for clipping the work 260, which is installed on one side thereof.

As seen from FIG. 18, there are provided two pairs of stoppers 226, 226, 226, 226 on both sides, each side having one pair, arranged on both insides of straight tracks 224 in sections X, Y of a buffer conveyor 220 and each pair of stoppers 226, 226 protrude rods or the like inward to stop a relay hanger 222 at predetermined positions by actions of solenoids or the like, when it is necessary to transfer a work between the buffer conveyor 220 and the feed conveyor 210 or between the buffer conveyor 220 and a deboner 265.

The predetermined positions are respectively selected at corresponding positions to transfer units 230 and loading units 250 along the straight tracks X, Y, as described later.

The transfer units 230, as seen in FIG. 16, are installed along the feed conveyor 210 on the feed conveyor side and arranged in sections of the straight tracks X, Y of a plurality of buffer conveyors 220, which are in parallel to the feed conveyor 210, wherein the buffer conveyors 220 are arranged in parallel to the feed conveyor 210. The loading units 250 are installed on the side of the buffer conveyor 220.

A transfer unit 230 has functions that a work 260 is transferred to a relay hanger 222 held on a buffer conveyor 220 from a work holder 215 fast held on the feed conveyor 210, when the work 260 is in transportation in the work holder 215 and the relay hanger 222 and the work holder are at opposed positions. The functions of the transfer unit 230 will be described with reference to FIG. 21.

As can be see from the figure, a transfer unit 230 comprises a company-run mechanism 231 and a synchronous-run mechanism 240. The company-run mechanism 231 further comprises: a linear run section 232, which can travel in parallel to the feed conveyor 210, and which is mounted on a side structure of the feed conveyor 210, and a company-run member 233. An engaging protrusion 233a, which can freely advance or retreat through an actuator 235 in a direction ② of an arrow, is mounted on the fore end of the company-run member 233. An engaging recess 227 is formed in the top of the relay hanger 222 and the engaging protrusion 233a is freely engaged in or disengaged from the engaging recess 227 of the relay hanger 222 when it is stopped between the stops 226, 226.

When the engaging protrusion 233a is engaged with the engaging recess 227, the stoppers 226, 226 retreat in a direction of an arrow ③.

The synchronous-run mechanism 240 comprises a catch member 245, which is vertically shiftable; and an actuator 241, which acts on the catch member 245 to drive.

When the catch member 245 shift down in a direction of an arrow ④, the catch member 240 comes to engage with the leading edge of a work holder base 214, which travel in the direction of an arrow A and the synchronous-run mechanism 245 can travel with the work holder base 214 of the work holder 215 in a synchronous manner through a spring member 243 for a cushion effect. The synchronous-run mechanism 240 is actuated to engage with the work holder 215, after the engaging protrusion 233a of the company-run member 233 fits in the engaging recess 227 in a perfect manner.

When the synchronous-run mechanism 240 starts a synchronous travel on its engagement with the work holder base 214, a work-moving mechanism 216 for shifting a work 260 acts to move the work 260 into a clip 222a of a relay hanger 222 in synchronous travel in a pressing manner.

An operation of the loading unit 250 shown in FIG. 16 is illustrated in FIG. 22. The operation is described below. The loading unit 250 comprises a linear run unit 251 and a guiding member 255, wherein the linear run unit 251 is actuated by a servo-motor not shown, which is mounted on a structure of a buffer conveyor 220. As shown in FIGS. 16, 22, the linear run unit 251 acts on a chuck 256 for holding the work of a deboner 265, which is opposed to the linear run unit 251, in a straight track section Y of travel, a work gripper 253, which can be opened or closed, is advanced in a direction of an arrow ⑥ by means of an actuator 252 mounted on the fore end of a translatable rod 257 of the linear run unit 251, the work 260, which has been clipped by a clipper 222a, is moved up to the chuck 256 for holding the work of the deboner 265 by the help of the guiding member 255 and thereby the work 260 is finally loaded on the deboner 265.

The linear run unit 251 is driven through a servo-motor and thereby the work gripper 253 can be stopped at a predetermined position with accuracy and certainty.

An auto-loading system for separating bone and meat of a poultry carcass of this invention is so contrived that works 260 are transported in the above mentioned manner, transferred to a plurality of relay units 222 placed on buffer conveyors 220 to make the works 260 stay for a while awaiting a time in point for loading and loaded at a right time to a deboner 265, which is operated in an intermittent manner, without any retardation on functions.

For operation without any retardation on functions, a control unit 270 comprises the following functions: means for selecting a transfer unit for transferring according to a waiting situation of works; means for actuating the transfer unit in a synchronized manner on the basis of a combination of a selecting signal from the selecting means, a signal of readiness for receiving a work by a relay hanger at a downstream position and a signal of presence of a work on a work holder of a buffer conveyor at an upstream position; means for actuating loading units in a synchronized manner on the basis of a combination of readiness for receiving a work by a deboner and a signal of presence of a work in an upstream position on a relay hanger of a buffer conveyor; and means for processing and judging signals of detection of a work on the feed conveyor at an upstream position of a transfer unit arranged along the feed conveyor, of detection of a relay hanger set at a receiving position by stoppers, of detection of an relay hanger with a work set at a predetermined position by stoppers and of detection of a work in a waiting situation.

Execution of a sequence control of a transfer unit will be described with reference to FIG. 21, as follows:

1. Output a signal to actuate the transfer unit 230,
2. Advance stoppers 226 along a direction of an arrow ① to set a relay hanger 222 at a predetermined position,
3. Advance an engaging protrusion 233a at the fore end of a company-run member 233 mounted in a company-run mechanism 231 along a direction of an arrow ②, engage in an engaging recess 227 of the relay hanger 222 and retreat the stoppers 226, 4. Shift down a catch member 245 of a synchronous-run mechanism 240 in a direction of an arrow ④, engage the catch member 245 with a work holding member 214 and transfer a company-run member 233 of a company-run mechanism 231 and a relay hanger 222 in engagement to a state of synchronous running in a direction of an arrow A together with the work holding member 214, 5. Operate a work moving mechanism 216 in a direction of an arrow ⑥, transfer the work 260 to a clip 222a to finish a work transfer operation to a buffer conveyor, 6. Retreat the engaging protrusion 233a, raise the catch member 245, start an actuator 232a and return a company-run member 233 back, in a direction of an arrow ⑤, to an original position, 7. retreat the stoppers 226 in a direction of an arrow ③× and advance the relay hanger 222 together with a running chain in a direction of an arrow B.

The fore-going description is generally made about an auto-loading system for separating bone and meat of cut-up parts of poultry carcasses as works. The auto-loading system can be also used for separating bone and meat of upper halves of poultry carcasses, wherein a chuck 256 for holding a work of a deboner 265 should be modified so as to be adaptive to a different shape of work.

According to the fore-going description of the third embodiment of this invention, an auto-loading system for feeding a plurality of deboners with works without no hindrance on their working can be provided, wherein the system comprises; a continuously working feed conveyor to which works are given by hand; a plurality of buffer conveyors each for a temporary stay of a work awaiting its loading; as many deboners which works in an intermittent manner; and a control unit for selecting a transfer unit in response to a waiting situation of works on the buffer conveyors. The auto-conveyor system makes it possible to transfer works with transfer units without any stoppage of the feed conveyor and thereby loading of works can be effected at a high degree in the system.

What is claimed is:

1. A method for separating breast meat together with wings from the upper half of a poultry carcass with an open bottom and an inner part, surrounded by ribs, which forms a cavity, comprising the steps of:

cutting tissues around a shoulder joint, including tissues such as a tendon, ligament, muscle, envelope and the like between or in the vicinity of the head of a humerus, a glenoid of a scapula, which construct a shoulder joint, to separate the breast meat from the body of the upper half together with wings from the ribs, and applying a separating force between the body of the upper half and a wing while cutting said tissues and while the upper half of said poultry carcass is supported, at a back side of the shoulder joint, by inserting a supporting member just fitting the cavity into the cavity.

2. A method for separating breast meat together with wings from the upper half of a poultry carcass according to claim 1, wherein a separating force causes dislocation between the glenoid of the scapula and the head of the humerus, which engages with the glenoid of the scapula.

3. A method for separating breast meat together with wings from the upper half of a poultry carcass according to claim 1, wherein under a separation force which is applied uninterruptedly to the humerus downwardly while the upper half of the poultry carcass is supported by the supporting member, the tissue is cut in order from the outside and a separating region of the tissue is open in order with the separating force while the cutting of the tissues is repeated in several times.

4. A method for separating breast meat together with wings from the upper half of a poultry carcass with an open bottom and an inner part, surrounded by ribs, which forms a cavity, comprising the steps of:

applying a separating force between the upper half of the poultry carcass and a humerus while the upper half of the carcass is supported, at a back side of the shoulder joint, by inserting a supporting member just fitting the cavity into the cavity while cutting tissues of the shoulder joint such as a tendon, ligament, muscle, envelope and the like around the joint which are between the head of a humerus of the shoulder joint and a glenoid cavity of the scapula;

cutting the upper side part of the clavicle; and separating the breast meat together with wings from the remainder of the upper half of the poultry carcass.

5. An apparatus for separating breast meat together with wings from the upper half of a poultry carcass with an open bottom and an inner part, surrounded by ribs, which forms a cavity, comprising:

a supporting member just fitting the cavity for supporting the upper half of the poultry carcass at the back side of the shoulder joint upon its insertion into the cavity from the bottom;

a separator which makes it possible to press down the head of a humerus being engaged with the joint of a scapula;

a cutter blade for cutting tissues; and a separating mechanism.

6. An apparatus for separating breast meat together with wings from the upper half of a poultry carcass according to claim 5, and further comprising;

a second cutter blade for cutting tissues from the shoulder side base of the clavicle to the joining position of the left and right clavicles along the upper side part of the clavicle.

7. An apparatus for separating breast meat together with wings from the upper half of a poultry carcass according to claim 6, wherein the separator has an oscillating mechanism to make it possible to apply a pressing force in any desired direction.

8. An apparatus for separating breast meat together with wings from the upper half of a poultry carcass according to claim 6, wherein a first cutter is capable of cutting into the horizontal direction alone the separator as a guide and a second cutter is a moving cutter which is capable of moving from the shoulder side base of the clavicle to the joining position of the left and right clavicles along the upper side part of the clavicle.

9. An apparatus for separating breast meat together with wings from the upper half of a poultry carcass according to claim 5, wherein the supporting member is formed approximately in the shape of a frustum of a cone.

10. An apparatus for separating breast meat together with wings from the upper half of a poultry carcass according to claim 5, wherein the separator is a profiled plate with a concave opening increasing in width toward the fore end for engaging with the joint of a scapula and moreover, downwardly pointed edges, for biting-in when a pressing force is applied, at the fore end of the lower side.

11. An apparatus for separating breast meat together with wings from the upper half of a poultry carcass according to claim 5, wherein the separator has a plurality of protrusions like a spike planted on the lower side.

12. An apparatus for separating breast meat together with wings from the upper half of a poultry carcass according to claim 5, wherein the separator has an oscillating mechanism to make it possible to apply a pressing force in any desired direction.

13. An apparatus for separating breast meat together with wings from the upper half of a poultry carcass according to claim 5, further comprising a mechanism for repeating and determining the necessary number of repeated actions for pressing of the separator and cutting of the cutter which works together with the separator.

14. A method for separating breast meat together with wings from the upper half of a poultry carcass with an open bottom and an inner part, surrounded by ribs, which forms a cavity, comprising the steps of:

inserting a guide bar with a proper size corresponding to a size of the upper half of a poultry carcass while pressing it into a space between the shoulder joints while the upper half of the poultry carcass is supported at the back side of a shoulder joint by inserting a supporting member, just fitting the cavity, into the cavity;

setting a vertical reference plane on the inside of the shoulder joint, which reference plane is used for determination of an inserting position of a horizontally moving cutter blade by a distance in a lateral direction from the vertical reference plane;

setting a horizontal plane, which is used for determination of an inserting position of the horizontally moving cutter blade by a distance in a vertical direction from the horizontal reference plane;

inserting an obliquely moving cutter blade from an inserting position obliquely in respect to the vertical reference plane; and cutting all the outside tendons and part of the inside tendons with the obliquely moving cutter blade to reduce a combining force and then inserting the horizontally moving cutter blade into a gap between the joint and the head of a humerus, which has already been widened by the pressing force applied to the head of a humerus, in order to completely cut the rest of the inside tendons remaining uncut.

15. An apparatus for separating breast meat together with wings from the upper half of a poultry carcass, comprising:

a fit-insert cone to be inserted into a cavity of the upper half of a poultry carcass, which is used for determining a location of a shoulder joint comprising the head of a humerus and a glenoid;

a separator which makes it possible to press down the head of a humerus being engaged with the joint of a scapula;

a plurality of cutter blades for cutting tissues; and a separating mechanism;

wherein the plurality of cutter blades is applied to cutting the tissues around the shoulder joint; and wherein the apparatus further comprises a plurality of guide bars for determining locations of the vertical and horizontal reference planes, each of which has a proper size corresponding to a size of the upper half of a poultry carcass, and one of which is inserted while a pressing force is applied; an obliquely moving cutter blade, which is mounted on a guide bar, is inserted at a right position to cut all the outside tendons and part of the inside tendons; and the horizontally moving cutter blade completely cuts the rest of the inside tendons remaining uncut.

16. An apparatus for separating breast meat together with wings from the upper half of a poultry carcass according to claim 15, wherein reference pieces are mounted on the upper side of a guide bar to enable the horizontal reference plane to be automatically positioned.

17. An apparatus for separating breast meat together with wings from the upper half of a poultry carcass according to claim 15, wherein an inserting position of the obliquely moving cutter blade is automatically determined by a guide bar selected according to a size of the upper half.

18. An apparatus for separating breast meat together with wings from the upper half of a poultry carcass according to claim 15, wherein the horizontally moving cutter blade can horizontally be movable along the separator and means for automatically determining an inserting position thereof according to a size of the upper size is provided.

* * * * *